US012177414B2

(12) United States Patent
Fattal

(10) Patent No.: US 12,177,414 B2
(45) Date of Patent: Dec. 24, 2024

(54) MULTIVIEW DISPLAY, SYSTEM, AND METHOD WITH USER TRACKING

(71) Applicant: LEIA INC., Menlo Park, CA (US)

(72) Inventor: David A. Fattal, Mountain View, CA (US)

(73) Assignee: LEIA Inc., Menlo Park, CA (US)

( * ) Notice: Subject to any disclaimer, the term of this patent is extended or adjusted under 35 U.S.C. 154(b) by 453 days.

(21) Appl. No.: 17/182,054

(22) Filed: Feb. 22, 2021

(65) Prior Publication Data
US 2021/0176453 A1     Jun. 10, 2021

Related U.S. Application Data

(63) Continuation of application No. PCT/US2018/048038, filed on Aug. 26, 2018.

(51) Int. Cl.
*H04N 13/366*     (2018.01)
*F21V 8/00*     (2006.01)
*G02B 30/33*     (2020.01)

(52) U.S. Cl.
CPC ......... *H04N 13/366* (2018.05); *G02B 6/0036* (2013.01); *G02B 30/33* (2020.01)

(58) Field of Classification Search
None
See application file for complete search history.

(56) References Cited

U.S. PATENT DOCUMENTS

| 4,711,512 A | 12/1987 | Upatnieks |
| 6,667,819 B2 | 12/2003 | Nishikawa et al. |
| 7,626,643 B2 | 12/2009 | Ijzerman et al. |
| | (Continued) | |

FOREIGN PATENT DOCUMENTS

| CA | 3107775 | 3/2020 |
| CN | 107950024 A | 4/2018 |
| | (Continued) | |

OTHER PUBLICATIONS

International Search Report and Written Opinion (ISRWO) from the International Searching Authority (ISA/KR) dated May 21, 2019 (14 pages) for counterpart parent PCT Application No. PCT/US2018/048038.

(Continued)

*Primary Examiner* — Eileen M Adams
(74) *Attorney, Agent, or Firm* — Schwegman Lundberg & Woessner, P.A.

(57) ABSTRACT

A user-tracking multiview display and a user-tracking multiview display system selectively provide a primary set of views and a secondary view according to a location of a user determined by a both a relative motion of the user-tracking multiview display and a periodic user location measurement. The user-tracking multiview display includes a multibeam backlight configured to provide directional light beams corresponding to different view directions of a multiview image and a light valve array configured to modulate the directional light beams to provide a plurality of views including the primary view set and the secondary view. The user-tracking multiview display system further includes a user tracker configured to determine a position of a user using both a periodic user location measurement and relative motion of the user-tracking multiview display system.

17 Claims, 9 Drawing Sheets

(56) References Cited

U.S. PATENT DOCUMENTS

| | | |
|---|---|---|
| 8,384,861 B2 | 2/2013 | Jepsen |
| 8,531,454 B2 | 9/2013 | Fukushima et al. |
| 8,681,174 B2 | 3/2014 | Nam et al. |
| 9,128,226 B2 | 9/2015 | Fattal et al. |
| 9,201,270 B2 | 12/2015 | Fattal et al. |
| 9,298,168 B2 | 3/2016 | Taff et al. |
| 9,372,349 B2 | 6/2016 | Brug et al. |
| 9,389,415 B2 | 7/2016 | Fattal et al. |
| 9,432,657 B2 | 8/2016 | Saito |
| 9,442,564 B1* | 9/2016 | Dillon .................. G06F 3/012 |
| 9,459,461 B2 | 10/2016 | Santori et al. |
| 9,557,466 B2 | 1/2017 | Fattal |
| 9,785,119 B2 | 10/2017 | Taff et al. |
| 9,791,701 B2 | 10/2017 | Ato et al. |
| 10,055,013 B2 | 8/2018 | Ramaswamy et al. |
| 10,551,546 B2* | 2/2020 | Fattal .................. G02B 30/33 |
| 10,649,128 B2 | 5/2020 | Fattal et al. |
| 10,684,404 B2 | 6/2020 | Fattal |
| 10,798,371 B2* | 10/2020 | Fattal .................. G02B 6/0078 |
| 10,802,443 B2 | 10/2020 | Fattal |
| 10,838,134 B2 | 11/2020 | Fattal et al. |
| 10,884,175 B2 | 1/2021 | Fattal |
| 10,928,677 B2 | 2/2021 | Aieta et al. |
| 2003/0025995 A1 | 2/2003 | Redert et al. |
| 2006/0227103 A1 | 10/2006 | Koo et al. |
| 2007/0109811 A1 | 5/2007 | Krijn et al. |
| 2007/0258140 A1 | 11/2007 | Shestak et al. |
| 2009/0040426 A1 | 2/2009 | Mather et al. |
| 2010/0002295 A1* | 1/2010 | Kimpe .................. G02B 30/27 359/465 |
| 2010/0293502 A1 | 11/2010 | Kang et al. |
| 2011/0141395 A1 | 6/2011 | Yashiro |
| 2011/0188106 A1 | 8/2011 | Bae et al. |
| 2011/0242441 A1 | 10/2011 | Minami |
| 2011/0310233 A1 | 12/2011 | Bathiche et al. |
| 2012/0200807 A1 | 8/2012 | Wei et al. |
| 2012/0206445 A1 | 8/2012 | Chiba |
| 2013/0050452 A1 | 2/2013 | Ramsey et al. |
| 2013/0286170 A1 | 10/2013 | Qin et al. |
| 2013/0329301 A1 | 12/2013 | Travis |
| 2014/0036361 A1 | 2/2014 | Woodgate et al. |
| 2014/0247330 A1 | 9/2014 | Baik et al. |
| 2015/0016777 A1 | 1/2015 | Abovitz et al. |
| 2015/0077526 A1 | 3/2015 | Kim et al. |
| 2015/0085089 A1 | 3/2015 | Shigemura |
| 2015/0226965 A1 | 8/2015 | Kim et al. |
| 2015/0355403 A1 | 12/2015 | Santori et al. |
| 2016/0018582 A1 | 1/2016 | Fiorentino et al. |
| 2016/0065955 A1* | 3/2016 | Kim .................. G03H 1/2286 348/54 |
| 2017/0363794 A1 | 12/2017 | Wan et al. |
| 2018/0188440 A1 | 7/2018 | Fattal |
| 2018/0188441 A1 | 7/2018 | Fattal |
| 2018/0196194 A1 | 7/2018 | Fattal |

FOREIGN PATENT DOCUMENTS

| | | |
|---|---|---|
| CN | 112639680 A | 4/2021 |
| EP | 2802148 A1 | 11/2014 |
| EP | 3841451 A1 | 6/2021 |
| JP | H0583746 A | 4/1993 |
| JP | 2005167445 A | 6/2005 |
| JP | 2010237416 A | 10/2010 |
| JP | 2011215422 | 10/2011 |
| JP | 2013013056 | 1/2013 |
| JP | 2021536588 | 12/2021 |
| KR | 20060106451 | 10/2006 |
| KR | 20140073851 A | 6/2014 |
| KR | 101629479 | 6/2016 |
| KR | 20180039051 | 4/2018 |
| KR | 20210037005 A | 4/2021 |
| WO | 2012038856 A1 | 3/2012 |
| WO | 2013132885 A1 | 9/2013 |
| WO | 2015041983 | 3/2015 |
| WO | 2017041072 | 3/2017 |
| WO | 2017041073 | 3/2017 |
| WO | 2017132579 | 8/2017 |
| WO | 2020046259 | 3/2020 |
| WO | 2020131087 A1 | 6/2020 |
| WO | 2020139338 A1 | 7/2020 |

OTHER PUBLICATIONS

Fattal, David et al., "A multi-directional backlight for a wide-angle, glasses-free three-dimensional display," Nature, Mar. 21, 2013, pp. 348-351, vol. 495, Macmillan Publishers Limited, 2013.

Reichelt et al., "Holographic 3-D Displays—Electro-holography within the Grasp of Commercialization," Advances in Lasers and Electro-Optics, Optics, Nelson Costa and Adolfo Cartaxo (Ed.), (2010), pp. 683-711, ISBN: 978-953-307-088-9, InTech, Available from: http://www.intechopen.com/books/advances-in-lasers-and-electro-optics/holographic-3-ddisplays-electro-holography-within-the-grasp-of-commercialization.

Travis et al., "Collimated light from a waveguide for a display backlight," Optics Express, Oct. 2009, pp. 19714-19719, vol. 17, No. 22.

Xu et al., "Computer-Generated Holography for Dynamic Display of 3D Objects with Full Parallax," International Journal of Virtual Reality, 2009, pp. 33-38, vol. 8, No. 2.

Son, Jung-Young et al., "Three-Dimensional Imaging Methods Based on Multiview Images," IEEE/OSA Journal of Display Technology, Sep. 2005, pp. 125-140, vol. 1, No. 1.

Kee, Edwin., "Hitachi Full Parallax 3D Display Offers Mind Bending Visuals," http://www.ubergizmo.com/2011/10/hitachi-full-parallax-3d-display-offers-mind-bending-visuals, Oct. 4, 2011, 2 pages.

"European Application Serial No. 18932230.8, Communication Pursuant to Article 94(3) EPC mailed Feb. 28, 2024", 4 pgs.

"European Application Serial No. 18932230.8, Extended European Search Report mailed Mar. 7, 2022", 9 pgs.

"Canadian Application Serial No. 3107775, Non Final Office Action mailed Mar. 30, 2022", 3 pgs.

"Canadian Application Serial No. 3107775, Non Final Office Action mailed Jan. 25, 2023", 5 pgs.

"Canadian Application Serial No. 3107775, Non Final Office Action mailed Nov. 2, 2023", 6 pgs.

"International Application Serial No. PCT US2018 048038, International Preliminary Report on Patentability mailed Mar. 11, 2021", 11 pgs.

"Canadian Application Serial No. 3,107,775, Voluntary Amendment filed Jan. 26, 2021", 40 pgs.

"Korean Application Serial No. 10-2021-7008997, Notice of Preliminary Rejection mailed Feb. 26, 2024", w English translation, 9 pgs.

"Chinese Application Serial No. 201880096867.8, Office Action mailed Apr. 30, 2024", w/ English Translation, 24 pgs.

"European Application Serial No. 18932230.8, Response filed Jun. 26, 2024 to Communication Pursuant to Article 94(3) EPC mailed Feb. 28, 2024", 9 pgs.

"European Application Serial No. 18932230.8, Response filed Sep. 9, 2022 to Extended European Search Report mailed Mar. 7, 2022", 16 pgs.204524

"European Application Serial No. 18932230.8, Response to Communication pursuant to Rules 161(2) and 162 EPC filed Sep. 30, 2021", 13 pgs.

"Korean Application Serial No. 10-2021-7008997, Office Action mailed Jun. 20, 2023", w/ English translation, 10 pgs.

"Korean Application Serial No. 10-2021-7008997, Response filed Sep. 26, 2023 to Office Action mailed Jun. 20, 2023", W/English Claims, 27 pgs.

"Japanese Application Serial No. 2021-510206, Notification of Reasons for Refusal mailed May 17, 2022", w English Translation, 9 pgs.

"Japanese Application Serial No. 2021-510206, Response filed Apr. 27, 2023 to Notification of Reasons for Refusal mailed Nov. 29, 2022", w English Claims, 17 pgs.

(56) References Cited

OTHER PUBLICATIONS

"Japanese Application Serial No. 2021-510206, Notification of Reasons for Refusal mailed Nov. 29, 2022", w English Translation, 9 pgs.

"Japanese Application Serial No. 2021-510206, Response filed Aug. 15, 2022 to Notification of Reasons for Refusal mailed May 17, 2022", w English Claims, 9 pgs.

* cited by examiner

MULTIVIEW DISPLAY, SYSTEM, AND METHOD WITH USER TRACKING

CROSS-REFERENCE TO RELATED APPLICATIONS

This application is a continuation application of and claims the benefit of priority to prior International Application No. PCT/US2018/048038, filed Aug. 26, 2018, the entire contents of which is incorporated herein by reference.

STATEMENT REGARDING FEDERALLY SPONSORED RESEARCH OR DEVELOPMENT

N/A

BACKGROUND

Electronic displays are a nearly ubiquitous medium for communicating information to users of a wide variety of devices and products. Most commonly employed electronic displays include the cathode ray tube (CRT), plasma display panels (PDP), liquid crystal displays (LCD), electroluminescent displays (EL), organic light emitting diode (OLED) and active matrix OLEDs (AMOLED) displays, electrophoretic displays (EP) and various displays that employ electromechanical or electrofluidic light modulation (e.g., digital micromirror devices, electrowetting displays, etc.). Generally, electronic displays may be categorized as either active displays (i.e., displays that emit light) or passive displays (i.e., displays that modulate light provided by another source). Among the most obvious examples of active displays are CRTs, PDPs and OLEDs/AMOLEDs. Displays that are typically classified as passive when considering emitted light are LCDs and EP displays. Passive displays, while often exhibiting attractive performance characteristics including, but not limited to, inherently low power consumption, may find somewhat limited use in many practical applications given the lack of an ability to emit light.

To overcome the limitations of passive displays associated with emitted light, many passive displays are coupled to an external light source. The coupled light source may allow these otherwise passive displays to emit light and function substantially as an active display. Examples of such coupled light sources are backlights. A backlight may serve as a source of light (often a panel backlight) that is placed behind an otherwise passive display to illuminate the passive display. For example, a backlight may be coupled to an LCD or an EP display. The backlight emits light that passes through the LCD or the EP display. The light emitted is modulated by the LCD or the EP display and the modulated light is then emitted, in turn, from the LCD or the EP display. Often backlights are configured to emit white light. Color filters are then used to transform the white light into various colors used in the display. The color filters may be placed at an output of the LCD or the EP display (less common) or between the backlight and the LCD or the EP display, for example.

BRIEF DESCRIPTION OF THE DRAWINGS

Various features of examples and embodiments in accordance with the principles described herein may be more readily understood with reference to the following detailed description taken in conjunction with the accompanying drawings, where like reference numerals designate like structural elements, and in which.

Figure 1A:
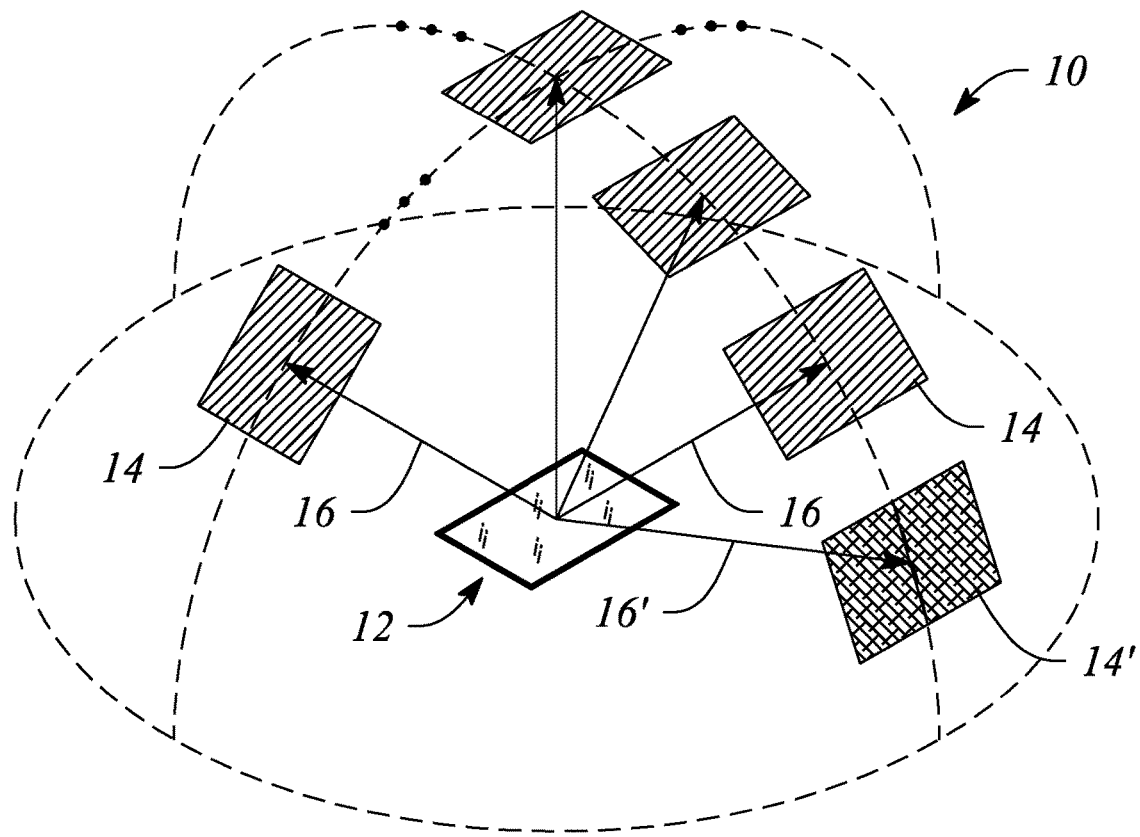
FIG. 1A illustrates a perspective view of a multiview display in an example, according to an embodiment consistent with the principles described herein.

Certain examples and embodiments have other features that are one of in addition to and in lieu of the features illustrated in the above-referenced figures. These and other features are detailed below with reference to the above-referenced figures.

DETAILED DESCRIPTION

Examples and embodiments in accordance with the principles described herein provide a multiview image display that employs user location or 'user-tracking'. Embodiments consistent with the principles described herein may employ a multiview display to provide different sets of views of a scene represented by a multiview image depending on a location of a user relative to the multiview display. In particular, a set of primary views may be provided when a user is located in a first position. The primary set of views is configured to provide a multiview image to the user within a range of viewing angles. Further, an augmented set of views may be provided when the user moves to or is located in a second position, e.g. beyond the range of viewing angles of the primary view set. The augmented view set includes a secondary view along with a subset of the primary views, according to various embodiments. The secondary view is angularly adjacent to but substantially beyond an angular range of the primary set of views and may represent either a terminal view of the primary view set or a perspective view of the scene not present in the primary view set, for example. Providing different view sets corresponding to different locations of a user may increase an effective angular field-of-view (FOV) of a multiview image being displayed. The increased angular FOV may reduce or mitigate so-called 'jumps' or 'inverted views' of multiview image perception that may occur when viewing a multiview image at an oblique angle, for example.

In various embodiments, user tracking may provide the position or location of the user relative to the multiview display using a combination of periodic user location measurement and relative motion of the multiview view display. For example, the user location may be determined or inferred by periodically measuring a location of a user's head. Further, relative motion of the multiview display may be used to infer or estimate the user location during time intervals between the periodic user location measurements.

Herein a 'two-dimensional display' or '2D display' is defined as a display configured to provide a view of an image that is substantially the same regardless of a direction from which the image is viewed (i.e., within a predefined viewing angle or range of the 2D display). A liquid crystal display (LCD) found in may smart phones and computer monitors are examples of 2D displays. In contrast herein, a 'multiview display' is defined as an electronic display or display system configured to provide different views of a multiview image in or from different view directions. In particular, the different views may represent different perspective views of a scene or object of the multiview image. In some instances, a multiview display may also be referred to as a three-dimensional (3D) display, e.g., when simultaneously viewing two different views of the multiview image provides a perception of viewing a three dimensional image.

FIG. 1A illustrates a perspective view of a multiview display 10 in an example, according to an embodiment consistent with the principles described herein. As illustrated in FIG. 1A, the multiview display 10 comprises a screen 12 to display or provide a multiview image to be viewed. The multiview display 10 provides different views 14 of the multiview image in different view directions 16 relative to the screen 12. The view directions 16 are illustrated as arrows extending from the screen 12 in various different principal angular directions; the different views 14 are illustrated as shaded polygonal boxes at the termination of the arrows (i.e., depicting the view directions 16); and only four views 14 and four view directions 16 are illustrated, all by way of example and not limitation. Note that while the different views 14 are illustrated in FIG. 1A as being above the screen, the views 14 actually appear on or in a vicinity of the screen 12 when the multiview image is displayed on the multiview display 10. Depicting the views 14 above the screen 12 is only for simplicity of illustration and is meant to represent viewing the multiview display 10 from a respective one of the view directions 16 corresponding to a particular view 14. FIG. 1A also illustrates a 'secondary' view 14'. The illustrated secondary view 14' represents a perspective of the scene, or equivalently has a secondary view direction 16', that is angularly adjacent to but substantially beyond an angular range of the views 14 (i.e., a primary set of views 14).

A view direction or equivalently, a light beam having a direction corresponding to a view direction, of a multiview display generally has a principal angular direction given by angular components $\{\theta, \phi\}$, by definition herein. The angular component $\theta$ is referred to herein as the 'elevation component' or 'elevation angle' of the light beam. The angular component $\phi$ is referred to as the 'azimuth component' or 'azimuth angle' of the light beam. By definition, the elevation angle $\theta$ is an angle in a vertical plane (e.g., perpendicular to a plane of the multiview display screen while the azimuth angle $\phi$ is an angle in a horizontal plane (e.g., parallel to the multiview display screen plane).

Figure 1B:
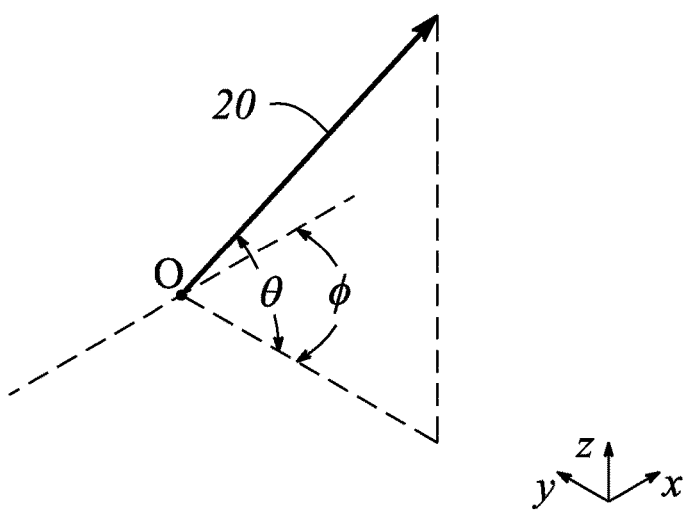
FIG. 1B illustrates a graphical representation of angular components of a light beam having a particular principal angular direction corresponding to a view direction of a multiview display in an example, according to an embodiment consistent with the principles described herein.

FIG. 1B illustrates a graphical representation of the angular components $\{\theta, \phi\}$ of a light beam 20 having a particular principal angular direction corresponding to a view direction (e.g., view direction 16 in FIG. 1A) of a multiview display in an example, according to an embodiment consistent with the principles described herein. In addition, the light beam 20 is emitted or emanates from a particular point, by definition herein. That is, by definition, the light beam 20 has a central ray associated with a particular point of origin within the multiview display. FIG. 1B also illustrates the light beam (or view direction) point of origin O.

Further herein, the term 'multiview' as used in the terms 'multiview image' and 'multiview display' is defined as a plurality of views representing different perspectives or including angular disparity between views of the view plurality. In addition, herein the term 'multiview' explicitly includes more than two different views (i.e., a minimum of three views and generally more than three views), by definition herein. As such, 'multiview display' as employed herein is explicitly distinguished from a stereoscopic display that includes only two different views to represent a scene or an image. Note however, while multiview images and multiview displays include more than two views, by definition herein, multiview images may be viewed (i.e., on a multiview display) as a stereoscopic pair of images by selecting only two of the multiview views to view at a time (i.e., one view per eye).

A 'multiview pixel' is defined herein as a set of sub-pixels or 'view' pixels in each of a similar plurality of different views of a multiview display. In particular, a multiview pixel may have an individual view pixels corresponding to or representing a view pixel in each of the different views of the multiview image. Moreover, the view pixels of the multiview pixel are so-called 'directional pixels' in that each of the view pixels is associated with a predetermined view direction of a corresponding one of the different views, by definition herein. Further, according to various examples and embodiments, the different view pixels of a multiview pixel may have equivalent or at least substantially similar locations or coordinates in each of the different views. For example, a first multiview pixel may have individual view pixels located at $\{x_1, y_1\}$ in each of the different views of a multiview image, while a second multiview pixel may have individual view pixels located at $\{x_2, y_2\}$ in each of the different views, and so on.

In some embodiments, a number of sub-pixels in a multiview pixel may be equal to a number of views of the multiview display. For example, the multiview pixel may provide sixty-four (64) sub-pixels associated with a multiview display having 64 different views. In another example, the multiview display may provide an eight by four array of views (i.e., thirty-two (32) views) and the multiview pixel may include 32 sub-pixels (i.e., one for each view). Additionally, each different sub-pixel may have an associated direction (i.e., a light beam principal angular direction) that corresponds to a different one of the view directions, for example, corresponding to the 64 different views, or corresponding to the 32 different views, in the above examples. Further, according to some embodiments, a number of multiview pixels of the multiview display may be substantially equal to a number of 'view' pixels (i.e., pixels that make up a selected view) in the multiview display views. For example, if a view includes six hundred forty by four hundred eighty view pixels (i.e., a 640×480 view resolution), the multiview display may have three hundred seven thousand two hundred (307,200) multiview pixels. In another example, when the views include one hundred by one hundred view pixels, the multiview display may include a total of ten thousand (i.e., 100×100=10,000) multiview pixels.

Herein, a 'light guide' is defined as a structure that guides light within the structure using total internal reflection. In particular, the light guide may include a core that is substantially transparent at an operational wavelength of the light guide. The term 'light guide' generally refers to a dielectric optical waveguide that employs total internal reflection to guide light at an interface between a dielectric material of the light guide and a material or medium that surrounds that light guide. By definition, a condition for total internal reflection is that a refractive index of the light guide is greater than a refractive index of a surrounding medium adjacent to a surface of the light guide material. In some embodiments, the light guide may include a coating in addition to or instead of the aforementioned refractive index difference to further facilitate the total internal reflection. The coating may be a reflective coating, for example. The light guide may be any of several light guides including, but not limited to, one or both of a plate or slab guide and a strip guide.

Further herein, the term 'plate' when applied to a light guide as in a 'plate light guide' is defined as a piece-wise or differentially planar layer or sheet, which is sometimes referred to as a 'slab' guide. In particular, a plate light guide is defined as a light guide configured to guide light in two substantially orthogonal directions bounded by a top surface and a bottom surface (i.e., opposite surfaces) of the light guide. Further, by definition herein, the top and bottom surfaces are both separated from one another and may be substantially parallel to one another in at least a differential sense. That is, within any differentially small section of the light guide, the top and bottom surfaces are substantially parallel or co-planar.

In some embodiments, the plate light guide may be substantially flat (i.e., confined to a plane) and therefore, the plate light guide is a planar light guide. In other embodiments, the plate light guide may be curved in one or two orthogonal dimensions. For example, the plate light guide may be curved in a single dimension to form a cylindrical shaped plate light guide. However, any curvature has a radius of curvature sufficiently large to insure that total internal reflection is maintained within the light guide to guide light.

Herein, an 'angle-preserving scattering feature' or equivalently an 'angle-preserving scatterer' is any feature or scatterer configured to scatter light in a manner that substantially preserves in scattered light an angular spread of light incident on the feature or scatterer. In particular, by definition, an angular spread $\sigma_S$ of light scattered by an angle-preserving scattering feature is a function of an angular spread $\sigma$ of the incident light (i.e., $\sigma_S = f(\sigma)$). In some embodiments, the angular spread $\sigma_S$ of the scattered light is a linear function of the angular spread or collimation factor $\sigma$ of the incident light (e.g., $\sigma_S = a \cdot \sigma$, where a is an integer). That is, the angular spread $\sigma_S$ of light scattered by an angle-preserving scattering feature may be substantially proportional to the angular spread or collimation factor $\sigma$ of the incident light. For example, the angular spread $\sigma_S$ of the scattered light may be substantially equal to the incident light angular spread $\sigma$ (e.g., $\sigma_S \approx \sigma$). A uniform diffraction grating (i.e., a diffraction grating having a substantially uniform or constant diffractive feature spacing or grating pitch) is an example of an angle-preserving scattering feature. In contrast, a Lambertian scatterer or a Lambertian reflector as well as a general diffuser (e.g., having or approximating Lambertian scattering) are not angle-preserving scatterers, by definition herein.

Herein, a 'polarization-preserving scattering feature' or equivalently a 'polarization-preserving scatterer' is any feature or scatterer configured to scatter light in a manner that substantially preserves in scattered light a polarization or at least a degree of polarization of the light incident on the feature or scatterer. Accordingly, a 'polarization-preserving scattering feature' is any feature or scatterer where a degree of polarization of a light incident on the feature or scatterer is substantially equal to the degree of polarization of the scattered light. Further, by definition, 'polarization-preserving scattering' is scattering (e.g., of guided light) that preserves or substantially preserves a predetermined polarization of the light being scattered. The light being scattered may be polarized light provided by a polarized light source, for example.

Herein, a 'diffraction grating' is generally defined as a plurality of features (i.e., diffractive features) arranged to provide diffraction of light incident on the diffraction grating. In some examples, the plurality of features may be arranged in a periodic or quasi-periodic manner. For example, the diffraction grating may include a plurality of features (e.g., a plurality of grooves or ridges in a material surface) arranged in a one-dimensional (1D) array. In other examples, the diffraction grating may be a two-dimensional (2D) array of features. The diffraction grating may be a 2D array of bumps on or holes in a material surface, for example.

As such, and by definition herein, the 'diffraction grating' is a structure that provides diffraction of light incident on the diffraction grating. If the light is incident on the diffraction grating from a light guide, the provided diffraction or diffractive scattering may result in, and thus be referred to as, 'diffractive coupling' in that the diffraction grating may couple light out of the light guide by diffraction. The diffraction grating also redirects or changes an angle of the light by diffraction (i.e., at a diffractive angle). In particular, as a result of diffraction, light leaving the diffraction grating generally has a different propagation direction than a propagation direction of the light incident on the diffraction grating (i.e., incident light). The change in the propagation direction of the light by diffraction is referred to as 'diffractive redirection' herein. Hence, the diffraction grating may be understood to be a structure including diffractive features that diffractively redirects light incident on the diffraction grating and, if the light is incident from a light guide, the diffraction grating may also diffractively couple out the light from the light guide.

Further, by definition herein, the features of a diffraction grating are referred to as 'diffractive features' and may be one or more of at, in and on a material surface (i.e., a boundary between two materials). The surface may be a surface of a light guide, for example. The diffractive features may include any of a variety of structures that diffract light including, but not limited to, one or more of grooves, ridges, holes and bumps at, in or on the surface. For example, the diffraction grating may include a plurality of substantially parallel grooves in the material surface. In another example, the diffraction grating may include a plurality of parallel ridges rising out of the material surface. The diffractive features (e.g., grooves, ridges, holes, bumps, etc.) may have any of a variety of cross-sectional shapes or profiles that provide diffraction including, but not limited to, one or more of a sinusoidal profile, a rectangular profile (e.g., a binary diffraction grating), a triangular profile and a saw tooth profile (e.g., a blazed grating).

According to various examples described herein, a diffraction grating (e.g., a diffraction grating of a multibeam element, as described below) may be employed to diffractively scatter or couple light out of a light guide (e.g., a plate light guide) as a light beam. In particular, a diffraction angle $\theta_m$ of or provided by a locally periodic diffraction grating may be given by equation (1) as:

$$\theta_m = \sin^{-1}\left(n \sin \theta_i - \frac{m\lambda}{d}\right) \quad (1)$$

where $\lambda$ is a wavelength of the light, m is a diffraction order, n is an index of refraction of a light guide, d is a distance or spacing between features of the diffraction grating, $\theta_i$ is an angle of incidence of light on the diffraction grating. For simplicity, equation (1) assumes that the diffraction grating is adjacent to a surface of the light guide and a refractive index of a material outside of the light guide is equal to one (i.e., $n_{out}=1$). In general, the diffraction order m is given by an integer. A diffraction angle $\theta_m$ of a light beam produced by the diffraction grating may be given by equation (1) where the diffraction order is positive (e.g., m>0). For example, first-order diffraction is provided when the diffraction order m is equal to one (i.e., m=1).

Figure 2:
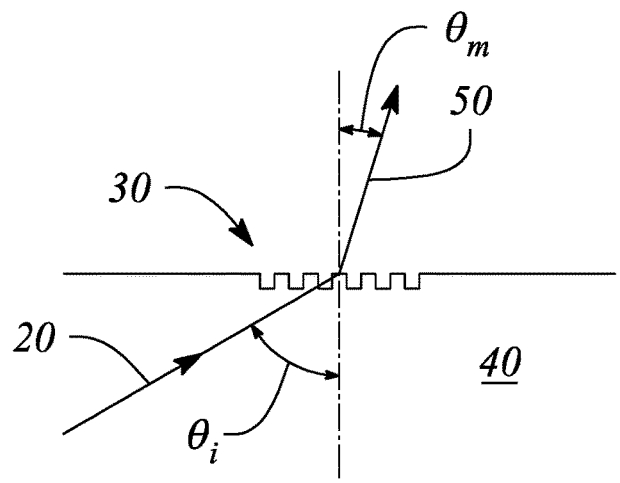
FIG. 2 illustrates a cross-sectional view of a diffraction grating in an example, according to an embodiment consistent with the principles described herein.

FIG. 2 illustrates a cross-sectional view of a diffraction grating 30 in an example, according to an embodiment consistent with the principles described herein. For example, the diffraction grating 30 may be located on a surface of a light guide 40. In addition, FIG. 2 illustrates a light beam 20 incident on the diffraction grating 30 at an incident angle $\theta_i$. The light beam 20 is a guided light beam within the light guide 40. Also illustrated in FIG. 2 is a scattered-out light beam 50 diffractively produced and scattered-out by the diffraction grating 30 as a result of diffraction of the incident light beam 20. The scattered-out light beam 50 has a diffraction angle $\theta_m$ (or 'principal angular direction' herein) as given by equation (1). The diffraction angle $\theta_m$ may correspond to a diffraction order 'm' of the diffraction grating 30, for example.

By definition herein, a 'multibeam element' is a structure or element of a backlight or a display that produces light that includes a plurality of light beams or a plurality of directional light beams. In some embodiments, the multibeam element may be optically coupled to a light guide of a backlight to provide the plurality of light beams by coupling out a portion of light guided in the light guide. In other embodiments, the multibeam element may generate light emitted as the directional light beams (e.g., may comprise a light source). Further, the directional light beams of the plurality of directional light beams produced by a multibeam element have different principal angular directions from one another, by definition herein. In particular, by definition, a directional light beam has a predetermined principal angular direction that is different from another directional light beam of the light beam plurality. Furthermore, the light beam plurality may represent a light field. For example, the light beam plurality may be confined to a substantially conical region of space or have a predetermined angular spread that includes the different principal angular directions of the light beams in the light beam plurality. As such, the predetermined angular spread of the directional light beams in combination (i.e., the light beam plurality) may represent the light field.

According to various embodiments, the different principal angular directions of the various light beams of the plurality are determined by a characteristic including, but not limited to, a size (e.g., length, width, area, etc.) of the multibeam element. In some embodiments, the multibeam element may be considered an 'extended point light source', i.e., a plurality of point light sources distributed across an extent of the multibeam element, by definition herein. Further, a light beam produced by the multibeam element has a principal angular direction given by angular components $\{\theta, \phi\}$, by definition herein, and as described above with respect to FIG. 1B.

Herein a 'collimator' is defined as substantially any optical device or apparatus that is configured to collimate light. For example, a collimator may include, but is not limited to, a collimating mirror or reflector, a collimating lens, or various combinations thereof. In some embodiments, the collimator comprising a collimating reflector may have a reflecting surface characterized by a parabolic curve or shape. In another example, the collimating reflector may comprise a shaped parabolic reflector. By 'shaped parabolic' it is meant that a curved reflecting surface of the shaped parabolic reflector deviates from a 'true' parabolic curve in a manner determined to achieve a predetermined reflection characteristic (e.g., a degree of collimation). A collimating lens may comprise a spherically shaped surface (e.g., a biconvex spherical lens).

According to various embodiments, an amount of collimation provided by the collimator may vary in a predetermined degree or amount from one embodiment to another. Further, the collimator may be configured to provide collimation in one or both of two orthogonal directions (e.g., a vertical direction and a horizontal direction). That is, the collimator may include a shape in one or both of two orthogonal directions that provides light collimation, according to some embodiments.

Herein, a 'collimation factor' is defined as a degree to which light is collimated. In particular, a collimation factor defines an angular spread of light rays within a collimated beam of light, by definition herein. For example, a collimation factor σ may specify that a majority of light rays in a beam of collimated light is within a particular angular spread (e.g., +/−σ degrees about a central or principal angular direction of the collimated light beam). The light rays of the collimated light beam may have a Gaussian distribution in terms of angle and the angular spread may be an angle determined by at one-half of a peak intensity of the collimated light beam, according to some examples.

Herein, a 'light source' is defined as a source of light (e.g., an optical emitter configured to produce and emit light). For example, the light source may comprise an optical emitter such as a light emitting diode (LED) that emits light when activated or turned on. In particular, herein the light source may be substantially any source of light or comprise substantially any optical emitter including, but not limited to, one or more of a light emitting diode (LED), a laser, an organic light emitting diode (OLED), a polymer light emitting diode, a plasma-based optical emitter, a fluorescent lamp, an incandescent lamp, and virtually any other source of light. The light produced by the light source may have a color (i.e., may include a particular wavelength of light), or may be a range of wavelengths (e.g., white light). In some embodiments, the light source may comprise a plurality of optical emitters. For example, the light source may include a set or group of optical emitters in which at least one of the optical emitters produces light having a color, or equivalently a wavelength, that differs from a color or wavelength of light produced by at least one other optical emitter of the set or group. The different colors may include primary colors (e.g., red, green, blue) for example. A 'polarized' light source is defined herein as substantially any light source that produces or provides light having a predetermined polarization. For example, the polarized light source may comprise a polarizer at an output of an optical emitter of the light source.

Further, as used herein, the article 'a' is intended to have its ordinary meaning in the patent arts, namely 'one or more'. For example, 'a multibeam element' means one or more multibeam elements and as such, 'the multibeam element' means 'the multibeam element(s)' herein. Also, any reference herein to 'top', 'bottom', 'upper', 'lower', 'up', 'down', 'front', back', 'first', 'second', 'left' or 'right' is not intended to be a limitation herein. Herein, the term 'about' when applied to a value generally means within the tolerance range of the equipment used to produce the value, or may mean plus or minus 10%, or plus or minus 5%, or plus or minus 1%, unless otherwise expressly specified. Further, the term 'substantially' as used herein means a majority, or almost all, or all, or an amount within a range of about 51% to about 100%. Moreover, examples herein are intended to be illustrative only and are presented for discussion purposes and not by way of limitation.

Figure 3:
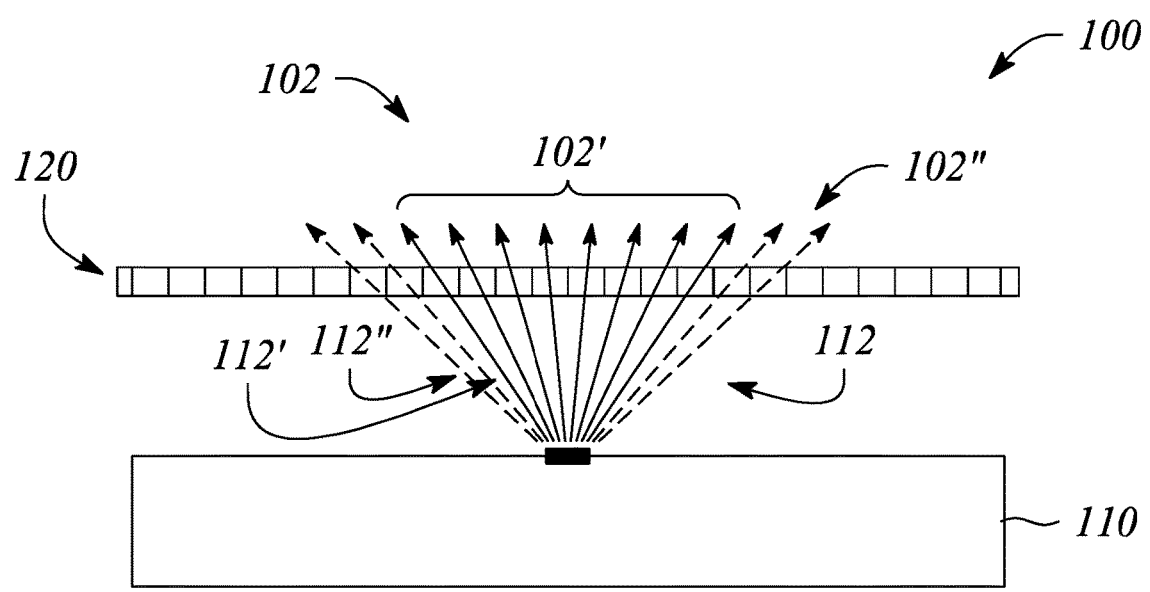
FIG. 3 illustrates a cross-sectional view of a user-tracking multiview display in an example, according to an embodiment consistent with the principles described herein.

According to some embodiments of the principles described herein, a user-tracking multiview display is provided. FIG. 3 illustrates a cross-sectional view of a user-tracking multiview display 100 in an example, according to an embodiment consistent with the principles described herein. The user-tracking multiview display 100 is configured to provide a plurality of views of a scene or object as a multiview image, i.e., a displayed multiview image. In particular, the plurality of views is provided in a corresponding plurality of view directions by the user-tracking multiview display 100. In FIG. 3, the view directions or equivalently the views of the view plurality are depicted as arrows 102 pointing in different angular directions that extend from the user-tracking multiview display 100.

According to various embodiments, the view plurality or more generally the multiview image provided by the user-tracking multiview display 100 comprises a set of primary views. For example, solid-line arrows 102' in FIG. 3 may represent the set of primary views or equivalently a set of directions of the primary view set. The view plurality provided by the user-tracking multiview display 100 further comprises a secondary view in a secondary view direction. The secondary view is located angularly adjacent to a terminal view of the primary view set. For example, dashed-line arrows 102" in FIG. 3 may represent the secondary view or secondary view directions. As illustrated, the secondary views represented by the dashed-line arrow 102" is located next to a view at each of a right edge and a left edge of the primary view set (i.e., solid-line arrows 102'). By definition herein, a view of the primary view set adjacent to an edge of the primary view set is or represents the terminal view. In FIG. 3, the primary view set represented by the solid arrows 102' has two terminal views, one at the left edge and one at the right edge.

According to some embodiments, the secondary view may represents a perspective or view direction of the scene or object that is angularly adjacent to but substantially beyond an angular range of the set of primary views. In particular, the secondary view may corresponds to a view direction having an view angle that is outside of an angular range subtended by the primary view set by definition herein, e.g., the angular range subtended by the solid-line arrows 102' in FIG. 3. In other embodiments, the secondary view may comprise the terminal view, as described in more detail below. According to various embodiments, the user-tracking multiview display 100 is configured to selectively provide either the primary view set or an augmented set of views. The augmented set of views comprises the secondary view and may further comprise a subset of views of the primary view set.

Referring to FIG. 3, the illustrated user-tracking multiview display 100 comprises a multibeam backlight 110. The multibeam backlight 110 is configured to provide a plurality of directional light beams 112 having different principal angular directions. In particular, directional light beams 112 provided by the multibeam backlight 110 have different principal angular directions corresponding to the different view directions of the user-tracking multiview display 100 or equivalently of the multiview image that is to be displayed by the user-tracking multiview display 100. For example, the arrows 102 in FIG. 3 may also represent the directional light beams 112 provided by the multibeam backlight 110 or equivalently the different principal angular directions of the directional light beams 112 corresponding to the different view directions.

Further, as illustrated in FIG. 3, the directional light beams 112 includes a first set of directional light beams 112' and a second set of directional light beams 112". In FIG. 3, the first set of directional light beams 112' is depicted using the solid-line arrows 102' and the second set of directional light beams 112" is depicted using the dashed-line arrows 102". The first set of directional light beams 112' represents directional light beams 112 having principal angular directions corresponding to view directions of the set of primary views. The second set of directional light beams 112" represents directional light beams 112 having principal angular directions corresponding to various secondary view directions.

The user-tracking multiview display 100 illustrated in FIG. 3 further comprises a light valve array 120. In various embodiments, any of a variety of different types of light valves may be employed as light valves of the light valve array 120 including, but not limited to, one or more of liquid crystal light valves, electrophoretic light valves, and light valves based on electrowetting.

The light valve array 120 is configured to modulate the directional light beams 112 to provide the various views of the multiview image. In particular, the light valve array 120 is configured to modulate the directional light beams 112 and to selectively provide the primary view set and the augmented view set including the secondary view. According to various embodiments, selection between providing the primary view set and the augmented view set is based on a location of a user or viewer of the user-tracking multiview display 100. For example, selection of the view set may be based on a location of a user's head relative to the user-tracking multiview display 100. Selection of the view set may be controlled by a driver (e.g., driver circuit) of the light valve array 120 under direction of a processor (e.g., a graphics processor unit) or similar circuit, for example. According to various embodiments, the location of the user (e.g., user's head) is determined by both a relative motion of the user-tracking multiview display and a periodic user location measurement.

Figure 4A:
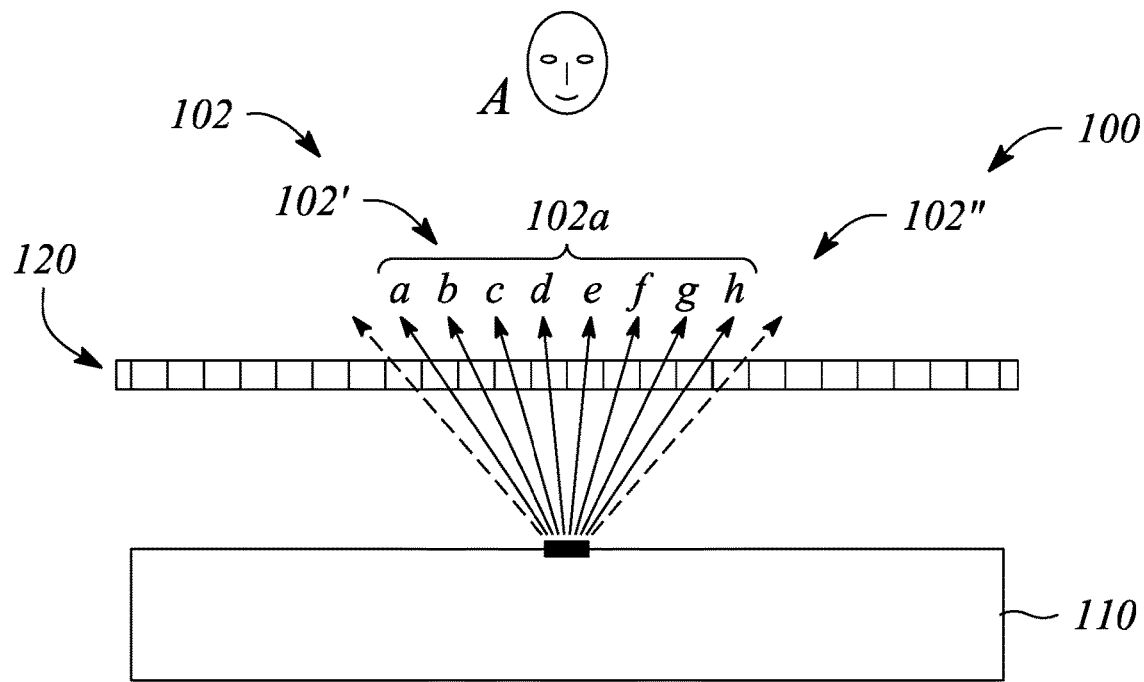
FIG. 4A illustrates a cross-sectional view of a user-tracking multiview display in an example, according to an embodiment consistent with the principles described herein.
Figure 4B:
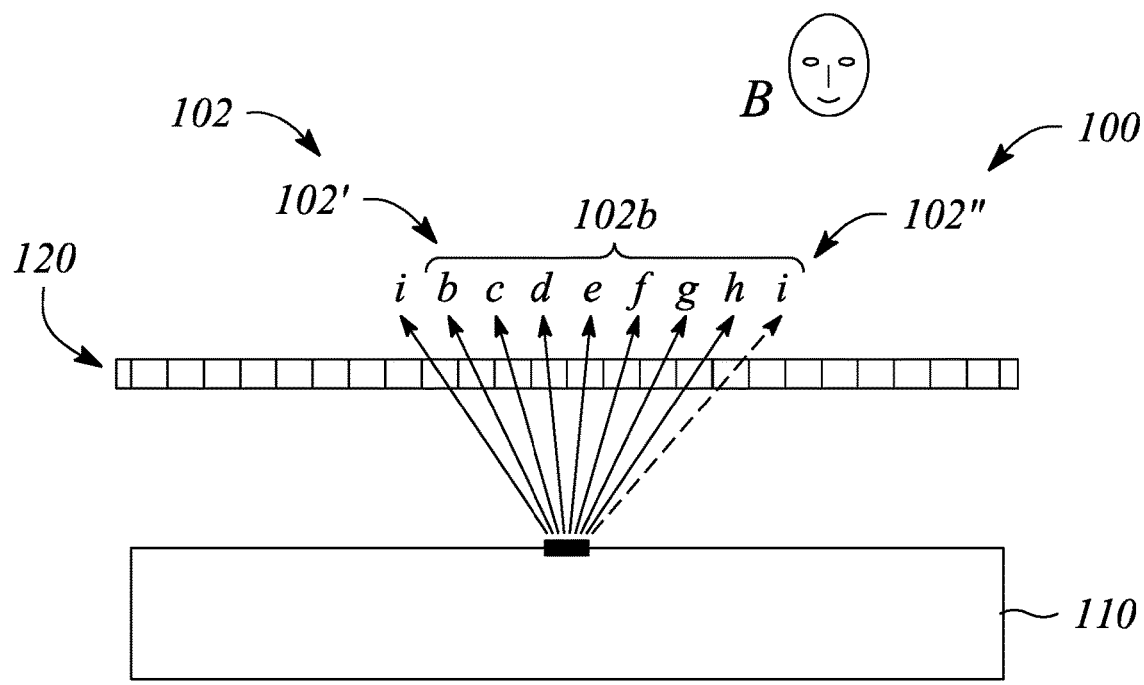
FIG. 4B illustrates a cross-sectional view of the user-tracking multiview display of FIG. 4A in another example, according to an embodiment consistent with the principles described herein.
Figure 4C:
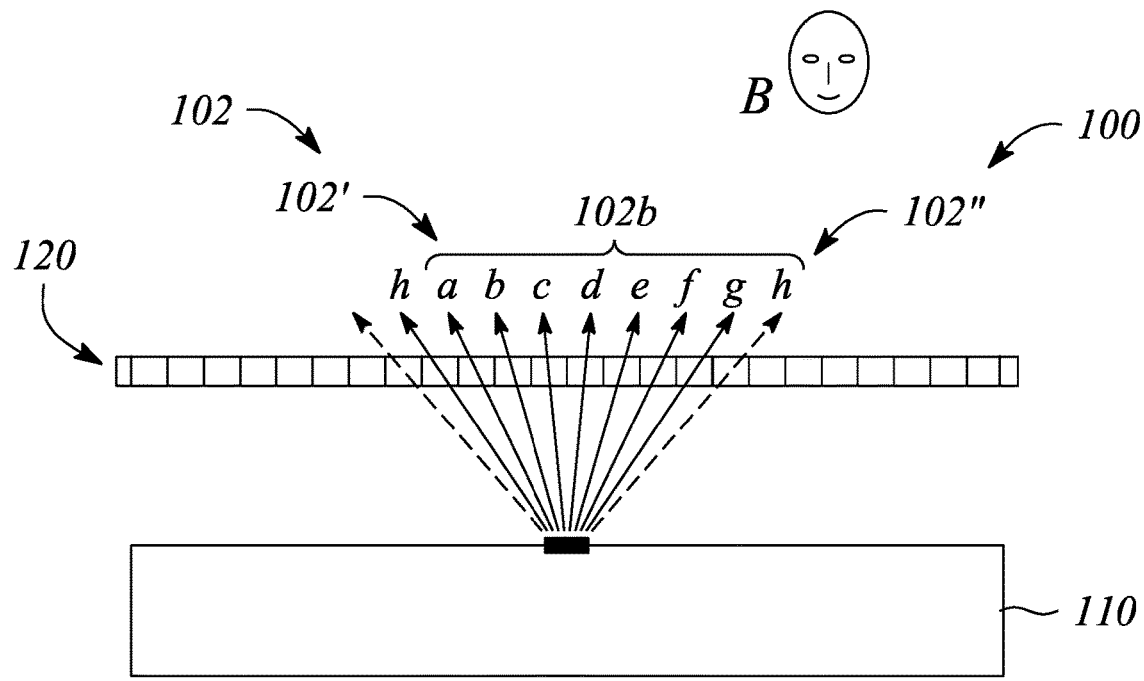
FIG. 4C illustrates a cross-sectional view of a user-tracking multiview display of FIG. 4A in an example, according to another embodiment consistent with the principles described herein.

FIG. 4A illustrates a cross-sectional view of a user-tracking multiview display 100 in an example, according to an embodiment consistent with the principles described herein. FIG. 4B illustrates a cross-sectional view of a user-tracking multiview display 100 of FIG. 4A in another example, according to an embodiment consistent with the principles described herein. FIG. 4C illustrates a cross-sectional view of a user-tracking multiview display 100 of FIG. 4A in an example, according to another embodiment consistent with the principles described herein. In particular, as illustrated in Figured 4A-4C, he user-tracking multiview display 100 comprises the multibeam backlight 110 and the light valve array 120, e.g., as described above for FIG. 3. Further, FIG. 4A illustrates the user-tracking multiview display 100 configured to selectively provide a primary set of views 102a. FIGS. 4B and 4C illustrate the user-tracking multiview display 100 configured to selectively provide an augmented set of views 102b. FIG. 4A also illustrates a user (or a user's head) in a first location A, while FIGS. 4B-4C illustrate the user (or user's head) in a second location B relative to the user-tracking multiview display 100. The location or position of the user (or user's head) is trackable or being tracked using both relative motion of the user-tracking multiview display 100 and periodic user location measurement, as is further described herein.

As described above with respect to FIG. 3, various views or equivalently view directions of both the primary view set 102a and the augmented view set 102b are represented by arrows 102. Specifically in FIGS. 4A-4C, solid-line arrows 102' represent the views or equivalently the view directions of the primary view set 102a and a dashed-line arrow 102" represents the secondary view or equivalently the secondary view direction, e.g., within the augmented view set 102b. In addition, in FIGS. 4A-4C, the various views or view directions are identified by letters that increase sequentially from left to right, where the letter 'a' represents a first view, the letter 'b' represents a second view, and so on. As illustrated, the primary view set 102a includes eight (8) views labeled 'a' through 'h' in FIG. 4A. The secondary view illustrated in FIG. 4B represents a ninth view representing a different perspective view of the scene and is labeled in FIG. 4B. Alternatively, the secondary view is the terminal view h (i.e., the secondary view is not a ninth view), as illustrated in FIG. 4C.

As illustrated in FIG. 4A, the user-tracking multiview display 100 may selectively display the primary view set 102a (i.e., solid-line arrows 102' labeled 'a' through 'h') when a user is located in the first position A. The first position A may be a region substantially in front of the user-tracking multiview display 100, for example. When the user is in the first position A, the user may see a 'normal' multiview image of the scene (e.g., a '3D image') as displayed by the user-tracking multiview display 100, for example. In particular, the 'normal' or front-facing multiview image is defined to include the primary view set 102a, which in turn includes views labeled 'a' through 'h', as illustrated in FIG. 4A.

As illustrated in FIGS. 4B-4C, the user-tracking multiview display 100 may selectively display the augmented view set 102b when a user is located in the second position B. In particular, FIGS. 4B-4C illustrates the user having moved or being located in the second position B. The second position 'B' may be substantially off to a side (i.e., 'off-side') of the user-tracking multiview display 100, for example, as illustrated in FIG. 4B. In other words, the second position 'B' may be outside of an angular range represented by the primary view set.

As illustrated in FIG. 4B, the augmented view set 102b comprises a subset of seven (7) of the views of the primary view set 102a (i.e., solid-line arrows 102' 'b'-'h') and a secondary view 'i' (i.e., a dashed-line arrow 102" labeled 'i') in the direction of the user's off-side location. The augmented view set 102b includes both a subset of the primary views (i.e., the subset excluding 'a') and the secondary view i in order to facilitate a view of the multiview image from the off-side user location. In particular, the user-tracking multiview display 100, may provide to the user, when in the second position B, an ability to see a portion of the scene or object in the multiview image from a perspective (i.e., the perspective represented by the secondary view) other than the perspectives present in the primary view set 102a (position A) as a result of the inclusion of the secondary view (i.e., i' in the direction of position B) in the augmented view set 102b represented by 'b' through 'i'.

FIG. 4C illustrates an embodiment in which the secondary view is the terminal view. In particular, as illustrated in FIG. 4C, the augmented view set 102b comprises the eight (8) views of the primary view set 102a illustrated in FIG. 4A, i.e., the views labeled 'a' through 'h'. However, the views have been shifted in FIG. 4C such that the terminal view h' of the primary view set 102a is presented to the user as the secondary view of the augmented view set 102b. Further, subset of the primary views within the augmented view set 102b comprise the other views 'a' through 'g'. Hence, as illustrated in FIG. 4C, the user-tracking multiview display 100, may provide to the user in the second position B the same views and the same perspectives present in the primary view set 102a (position A) as a result of the inclusion of the secondary view (i.e., h' in the direction of position B) and the shift of the other views 'a' through 'g' in the augmented view set 102b.

In both embodiments (i.e., FIGS. 4B and 4C), the inclusion of the secondary view provided by the user-tracking multiview display 100, may reduce or even substantially eliminate so-called 'jumps' that may occur when a multiview image is viewed by the user from an angle that is substantially beyond the 'normal' or front-facing viewing angle of the user-tracking multiview display 100, for example. Note that, while the location of the user is described herein with respect to a first position and a second position, the scope of the principles described herein are not limited to only two positions of the user (or equivalently the user's head). The scope of the principles herein is intended to include any number of different positions of the user of the user-tracking multiview display 100.

According to various embodiments of the principles described herein, the user-tracking multiview display 100 may comprise substantially any multibeam backlight. In particular, any backlight configured to provide the directional light beams 112 having different principal angular directions corresponding to different view directions of a multiview image may be used, according to various embodiments. For example, in some embodiments, the multibeam backlight 110 may be based on a multibeam diffraction grating. In other embodiments, the multibeam backlight 110 of the user-tracking multiview display 100 comprises a multibeam element. The multibeam backlight 110 may comprise a light guide and a plurality of multibeam elements, as described below.

Figure 5A:
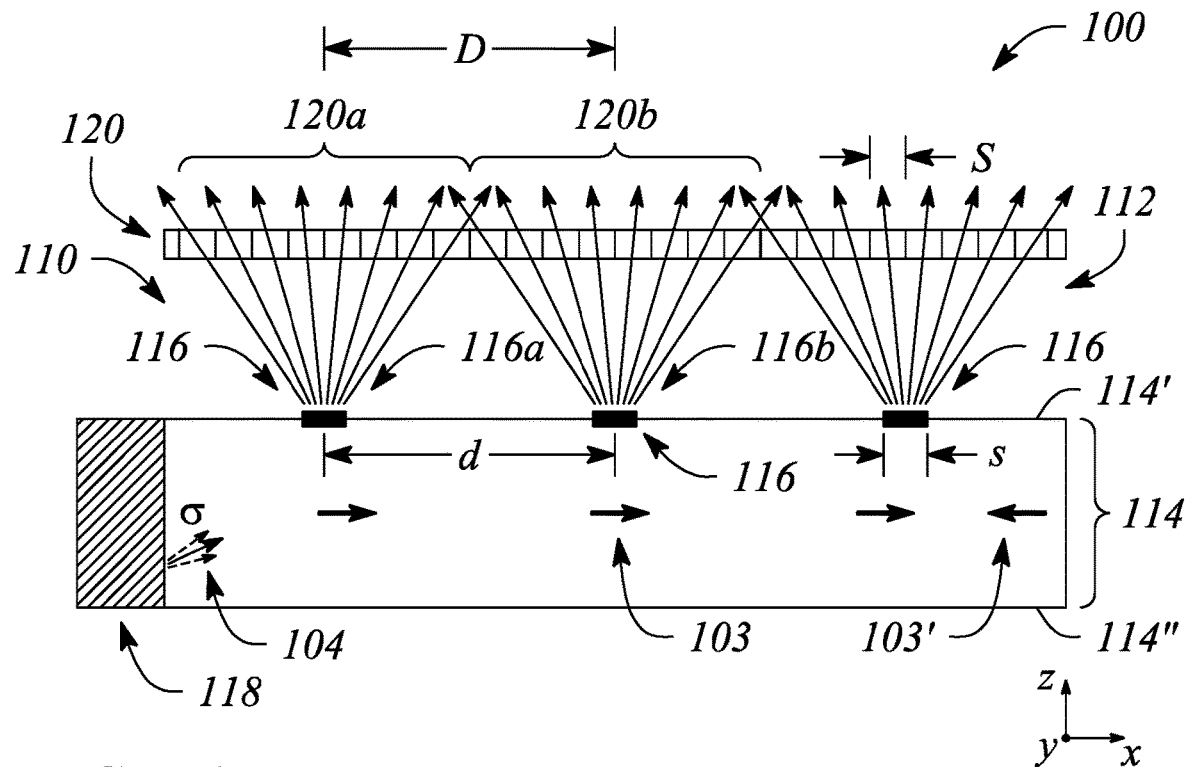
FIG. 5A illustrates a cross-sectional view of a user-tracking multiview display including a multibeam backlight in an example, according to an embodiment consistent with the principles described herein.
Figure 5B:
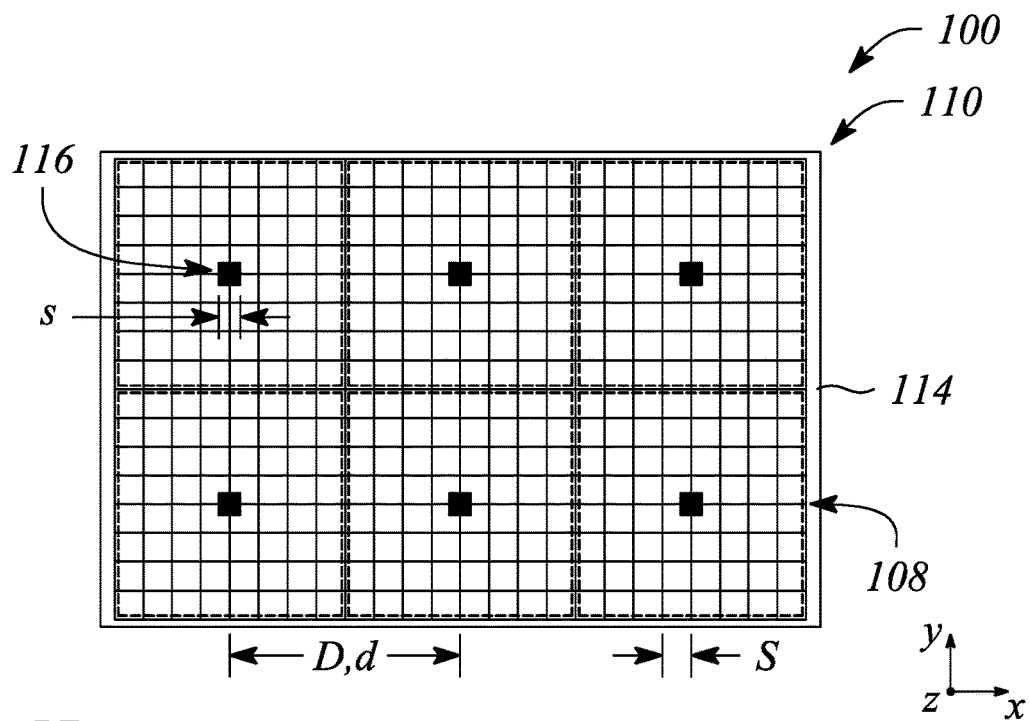
FIG. 5B illustrates a plan view of a user-tracking multiview display including a multibeam backlight in an example, according to an embodiment consistent with the principles described herein.
Figure 5C:
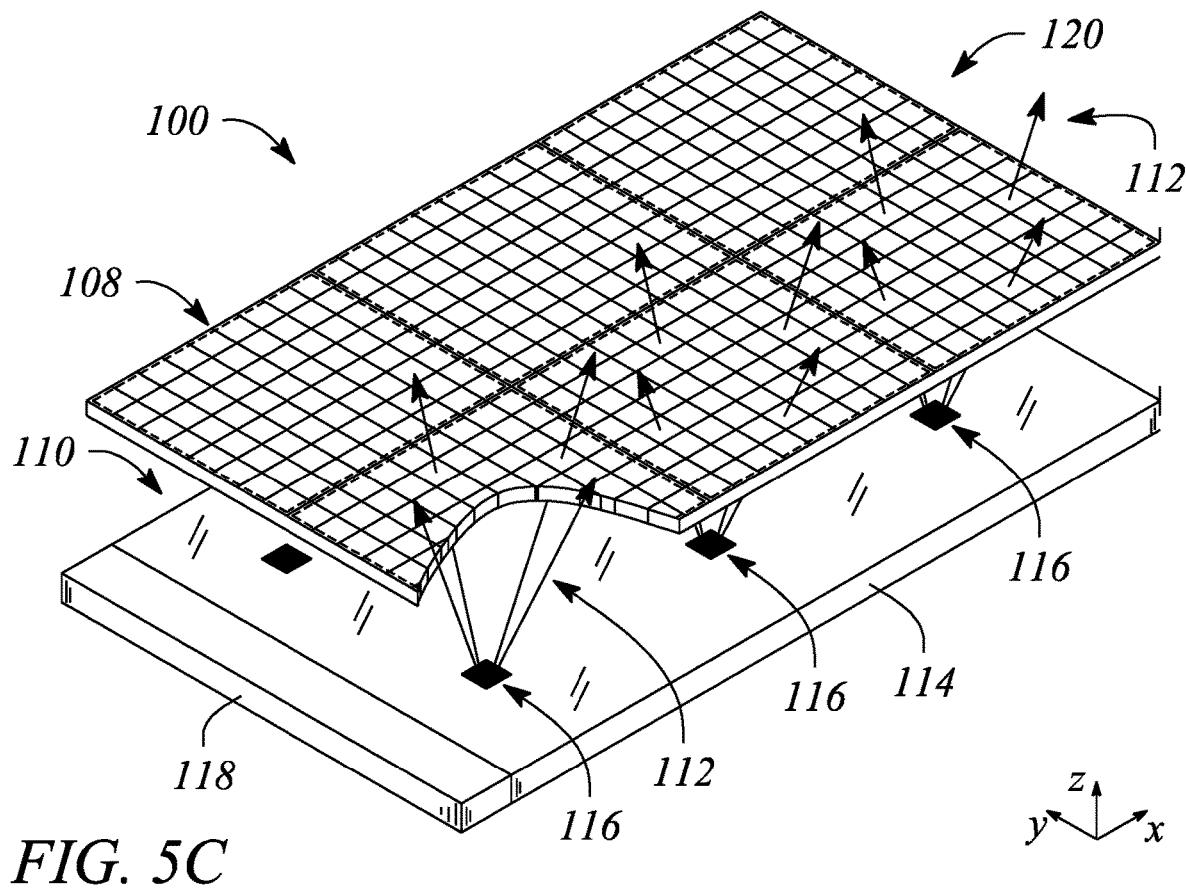
FIG. 5C illustrates a perspective view of a user-tracking multiview display including a multibeam backlight in an example, according to an embodiment consistent with the principles described herein.

FIG. 5A illustrates a cross-sectional view of a user-tracking multiview display 100 including a multibeam backlight 110 in an example, according to an embodiment consistent with the principles described herein. FIG. 5B illustrates a plan view of a user-tracking multiview display 100 including a multibeam backlight 110 in an example, according to an embodiment consistent with the principles described herein. FIG. 5C illustrates a perspective view of a user-tracking multiview display 100 including a multibeam backlight 110 in an example, according to an embodiment consistent with the principles described herein. The perspective view in FIG. 5C is illustrated with a partial cut-away to facilitate discussion herein only. FIGS. 5A-5C also illustrate a light valve array 120 positioned above the multibeam backlight 110, as is described further below.

The multibeam backlight 110 illustrated in FIGS. 5A-5C is configured to provide the directional light beams 112 having different principal angular directions from one another (e.g., as a light field). In particular, as illustrated in FIGS. 5A and 5C, the provided the directional light beams 112 are directed away from the multibeam backlight 110 in different principal angular directions that correspond to respective view directions of the user-tracking multiview display 100, according to various embodiments. Further, the directional light beams 112 may be modulated (e.g., using light valves of a light valve array 120, as described herein) to facilitate the display of information a multiview image by the user-tracking multiview display 100.

As illustrated in FIGS. 5A-5C, the multibeam backlight 110 comprises a light guide 114. The light guide 114 may be a plate light guide, according to some embodiments. The light guide 114 is configured to guide light along a length of the light guide 114 as guided light 104, for example having a direction indicated by bold arrows 103. The light guide 114 may include a dielectric material configured as an optical waveguide, for example. The dielectric material may have a first refractive index that is greater than a second refractive index of a medium surrounding the dielectric optical waveguide. The difference in refractive indices is configured to facilitate total internal reflection of the guided light 104 according to one or more guided modes of the light guide 114.

In some embodiments, the light guide 114 may be a slab or plate optical waveguide comprising an extended, substantially planar sheet of optically transparent, dielectric material. According to various examples, the optically transparent material of the light guide 114 may include or be made up of any of a variety of dielectric materials including, but not limited to, one or more of various types of glass (e.g., silica glass, alkali-aluminosilicate glass, borosilicate glass, etc.), one or more substantially optically transparent plastics or polymers (e.g., poly(methyl methacrylate) or 'acrylic glass', polycarbonate, etc.) or a combination thereof. In some examples, the light guide 114 may further include a cladding layer (not illustrated) on at least a portion of a surface (e.g., one or both of the top surface and the bottom surface) of the light guide 114. The cladding layer may be used to further facilitate total internal reflection.

Further, according to some embodiments, the light guide 114 is configured to guide the guided light 104 at a non-zero propagation angle between a first surface 114' (e.g., 'front' surface or side) and a second surface 114" (e.g., 'back' surface or side) of the light guide 114. The guided light 104 may propagate by reflecting or 'bouncing' between the first surface 114' and the second surface 114" of the light guide 114 at the non-zero propagation angle (albeit in the a propagation direction indicated by the bold arrows 103). In some embodiments, a plurality of beams of the guided light 104 comprising different colors of light may be guided by the light guide 114 at respective ones of different color-specific, non-zero propagation angles. Note that the non-zero propagation angle is not illustrated in FIGS. 5A-5C for simplicity of illustration.

As defined herein, a 'non-zero propagation angle' is an angle relative to a surface (e.g., the first surface 114' or the second surface 114") of the light guide 114. Further, the non-zero propagation angle is both greater than zero and less than a critical angle of total internal reflection within the light guide 114, in accordance with the principles described herein. For example, the non-zero propagation angle of the guided light 104 may be between about ten (10) degrees and about fifty (50) degrees or, in some examples, between about twenty (20) degrees and about forty (40) degrees, or between about twenty-five (25) degrees and about thirty-five (35) degrees. For example, the non-zero propagation angle may be about thirty (30) degrees. In other examples, the non-zero propagation angle may be about 20 degrees, or about 25 degrees, or about 35 degrees. Moreover, a specific non-zero propagation angle may be chosen (e.g., arbitrarily) for a particular implementation as long as the specific non-zero propagation angle is chosen to be less than the critical angle of total internal reflection within the light guide 114.

The guided light 104 in the light guide 114 may be introduced or coupled into the light guide 114 at the non-zero propagation angle (e.g., about 30-35 degrees). One or more of a lens, a mirror or similar reflector (e.g., a tilted collimating reflector), a diffraction grating coupler, and a prism (not illustrated) may facilitate coupling light into an input end of the light guide 114 as the guided light 104 at the non-zero propagation angle, for example. Once coupled into the light guide 114, the guided light 104 propagates along the light guide 114 in a direction that may be generally away from the input end (e.g., illustrated by bold arrows 103 pointing along an x-axis in FIG. 5A).

Further, the guided light 104 or equivalently a guided light beam produced by coupling light into the light guide 114 is a collimated beam of light in accordance with the principles described herein. Herein, a 'collimated light' or 'collimated light beam' is generally defined as a beam of light in which rays of the light beam are substantially parallel to one another within the light beam (e.g., the guided light 104). Further, rays of light that diverge or are scattered from the collimated light beam are not considered to be part of the collimated light beam, by definition herein. In some embodiments, the multibeam backlight 110 may include a collimator, such as a lens, reflector or mirror, as described above, (e.g., tilted collimating reflector) to collimate the light, e.g., from a light source. In some embodiments, the light source comprises a collimator. The collimated light provided to the light guide 114 is a collimated light beam to be guided. The guided light 104 may be collimated according to or having a collimation factor σ, in various embodiments.

In some embodiments, the light guide 114 may be configured to 'recycle' the guided light 104. In particular, the guided light 104 that has been guided along the light guide length may be redirected back along that length in another, different propagation direction indicated by bold arrow 103'. For example, the light guide 114 may include a reflector (not illustrated) at an end of the light guide 114 opposite to an input end adjacent to the light source. The reflector may be configured to reflect the guided light 104 back toward the input end as recycled guided light. Recycling guided light in this manner may increase a brightness of the multibeam backlight 110 (e.g., an intensity of the scattered-out directional light beams 112) by making guided light 104 available more than once, for example, to the multibeam elements, described below.

In FIG. 5A, the bold arrow 103' indicating another propagation direction of recycled guided light (e.g., directed in a negative x-direction) illustrates a general propagation direction of the recycled guided light within the light guide 114 that was introduced into the light guide 114 from the aforementioned input end. Alternatively (e.g., as opposed to the recycled guided light) or in addition to the recycled guided light, in some embodiments, light may be introduced into the light guide 114 at the end opposite to the aforementioned input end that has the other propagation direction (i.e., bold arrow 103' directed in a negative x-direction), e.g., in addition to the guided light 104 from the aforementioned input end having the propagation direction indicated by the bold arrows 103.

As illustrated in FIGS. 5A-5C, the multibeam backlight 110 further comprises a plurality of multibeam elements 116 spaced apart from one another along the light guide length (x-direction). In particular, the multibeam elements 116 of the element plurality are separated from one another by a finite space and represent individual, distinct elements along the light guide length. That is, by definition herein, the multibeam elements 116 of the plurality are spaced apart from one another according to a finite (i.e., non-zero) inter-element distance (e.g., a finite center-to-center distance). Further the multibeam elements 116 of the element plurality generally do not intersect, overlap or otherwise touch one another, according to some embodiments. That is, each multibeam element 116 of the element plurality is generally distinct and separated from other ones of the multibeam elements 116.

According to some embodiments, the multibeam elements 116 of the plurality may be arranged in either a one-dimensional (1D) array or two-dimensional (2D) array. For example, the plurality of multibeam elements 116 may be arranged as a linear 1D array. In another example, the plurality of multibeam elements 116 may be arranged as a rectangular 2D array or as a circular 2D array. Further, the array (i.e., 1D or 2D array) may be a regular or uniform array, in some examples. In particular, an inter-element distance (e.g., center-to-center distance or spacing) between the multibeam elements 116 may be substantially uniform or constant across the array. In other examples, the inter-element distance between the multibeam elements 116 may be varied one or both of across (y-direction) the array and along the length (x-direction) of the light guide 114.

According to various embodiments, a multibeam element 116 of the element plurality is configured to scatter out a portion of the guided light 104 as the directional light beams 112. In particular, FIGS. 5A and 5C illustrate the scattered-out directional light beams 112 as a plurality of diverging arrows depicted as being directed way from the first (or front) surface 114' of the light guide 114. Further, a size of the multibeam element 116 is comparable to a size of a 'sub-pixel' in a multiview pixel or equivalently, is comparable to a size of a light valve in the light valve array 120, according to various embodiments. Herein, the 'size' may be defined in any of a variety of manners to include, but not be limited to, a length, a width or an area. For example, the size of a light valve (or 'sub-pixel') may be a length thereof and the comparable size of the multibeam element 116 may also be a length of the multibeam element 116. In another example, size may refer to an area such that an area of the multibeam element 116 may be comparable to an area of the light valve (or 'sub-pixel').

In some embodiments, the size of the multibeam element 116 is comparable to the light valve size such that the multibeam element size is between about fifty percent (50%) and about two hundred percent (200%) of the light valve size. In some embodiments, if the multibeam element size is denoted 's' and the light valve size is denoted 'S' (e.g., as illustrated in FIG. 5A), then the multibeam element size s may be given by equation (2) as $$\frac{1}{2}S \leq s \leq 2S \tag{2}$$

In some examples, the multibeam element size is equal to or greater than about sixty percent (60%) of the light valve size, or equal to or greater than about seventy percent (70%) of the light valve size, or equal to or greater than about eighty percent (80%) of the light valve size, or equal to or greater than about ninety percent (90%) of the light valve size. In some examples, the multibeam element is equal to or less than about one hundred eighty percent (180%) of the light valve size, or equal to or less than about one hundred sixty percent (160%) of the light valve size, or equal to or less than about one hundred forty percent (140%) of the light valve size, or equal to or less than about one hundred twenty percent (120%) of the light valve size. In some embodiments, by 'comparable size', the multibeam element size may be between about seventy-five percent (75%) and about one hundred fifty (150%), inclusive, of the light valve size. In another embodiment, the multibeam element 116 may be comparable in size to the light valve where the multibeam element size is between about one hundred twenty-five percent (125%) and about eighty-five percent (85%), inclusive, of the light valve size. According to some embodiments, the comparable sizes of the multibeam element 116 and the light valve may be chosen to reduce, or in some embodiments to minimize, dark zones between views of the multiview display, while at the same time reducing, or in some embodiments minimizing, an overlap between views of the multiview display.

As mentioned above, FIGS. 5A-5C further illustrate the light valve array 120 positioned above the multibeam backlight 110. The light valve array 120, so positioned, is configured to modulate the plurality of scattered-out directional light beams 112. In FIG. 5C, the light valve array 120 is partially cut-away to allow visualization of the light guide 114 and the multibeam element 116 underlying the light valve array 120.

As illustrated in FIGS. 5A-5C, different ones of the scattered-out, directional light beams 112 having different principal angular directions pass through and may be modulated by respective different ones of the light valves in the light valve array 120. Further, a light valve of the light valve array 120 corresponds to a sub-pixel, and a set of the light valves corresponds to a multiview pixel of the user-tracking multiview display 100. In particular, a different set of light valves of the light valve array 120 is configured to receive and modulate the scattered-out directional light beams 112 from different ones of the multibeam elements 116, i.e., there is one unique set of light valves for each multibeam element 116, as illustrated in FIGS. 5A-5C.

As illustrated in FIG. 5A, a first light valve set 120a is configured to receive and modulate the directional light beams 112 scattered out from a first multibeam element 116a, a second light valve set 120b is configured to receive and modulate the directional light beams 112 scattered out from a second multibeam element 116b. Moreover, each of the light valve sets (e.g., the first and second light valve sets 120a, 120b) in the light valve array 120 corresponds, respectively, to a different multiview pixel 108 (see FIG. 5B), with individual light valves of the light valve sets 120a, 120b corresponding to the sub-pixels of the respective different multiview pixels 108, as illustrated in FIGS. 5A-5C.

In some embodiments, a relationship between the multibeam elements 116 and corresponding multiview pixels 108 (e.g., sets of light valves 120a, 120b) may be a one-to-one relationship. That is, there may be an equal number of multiview pixels 108 and multibeam elements 116. In FIG. 5B, the one-to-one relationship is illustrated by way of example, where each multiview pixel 108 (comprising a different set of light valves) is illustrated as being surrounded by a dashed line. In other embodiments (not illustrated), the number of multiview pixels and multibeam elements may differ from one another.

In some embodiments, an inter-element distance (e.g., center-to-center distance) between a pair of adjacent multibeam elements 116 may be equal to an inter-pixel distance (e.g., a center-to-center distance) between a corresponding adjacent pair of multiview pixels 108, e.g., represented by light valve sets. For example, as illustrated in FIG. 5A, a center-to-center distance d between the first multibeam element 116a and the second multibeam element 116b is substantially equal to a center-to-center distance D between the first light valve set 120a and the second light valve set 120b. In other embodiments (not illustrated), the relative center-to-center distances of pairs of multibeam elements 116 and corresponding light valve sets may differ, e.g., the multibeam elements 116 may have an inter-element spacing (i.e., center-to-center distance d) that is one of greater than or less than a spacing (i.e., center-to-center distance D) between light valve sets representing multiview pixels.

In some embodiments, a shape of the multibeam element 116 is analogous to a shape of the multiview pixel 108 or equivalently, a shape of a set (or 'sub-array') of the light valves in the light valve array 120 corresponding to the multiview pixel 108. For example, the multibeam element 116 may have a substantially square shape and the multiview pixel 108 (or an arrangement of a corresponding set of light valves) may be substantially square. In another example, the multibeam element 116 may have a substantially rectangular shape, i.e., may have a length or longitudinal dimension that is greater than a width or transverse dimension. In this example, the multiview pixel 108 corresponding to the multibeam element 116 may have a substantially analogous rectangular shape. FIG. 5B illustrates a top or plan view of square-shaped multibeam elements 116 and corresponding square-shaped multiview pixels comprising square sets of light valves, e.g., outlined by dashed lines. In yet other examples (not illustrated), the multibeam elements 116 and the corresponding multiview pixels have various shapes including or at least approximated by, but not limited to, a triangular shape, a hexagonal shape, and a circular shape.

According to various embodiments, the multibeam elements 116 may comprise any of a number of different structures configured to scatter out a portion of the guided light 104. For example, the different structures may include, but are not limited to, diffraction gratings, micro-reflective elements, micro-refractive elements, or various combinations thereof. In some embodiments, the multibeam element 116 comprising a diffraction grating is configured to diffractively scatter out of the light guide 114 a portion of the guided light 104 as the directional light beams 112 having the different principal angular directions. In another embodiment, the multibeam element 116 comprising a micro-reflective element is configured to reflectively scatter out of the light guide 114 the guided light portion as the directional light beams 112. In other embodiments, the multibeam element 116 comprising a micro-refractive element is configured to scatter out of the light guide 114 the guided light portion as the directional light beams 112 by or using refraction (i.e., refractively scatter out the guided light portion).

Figure 6A:
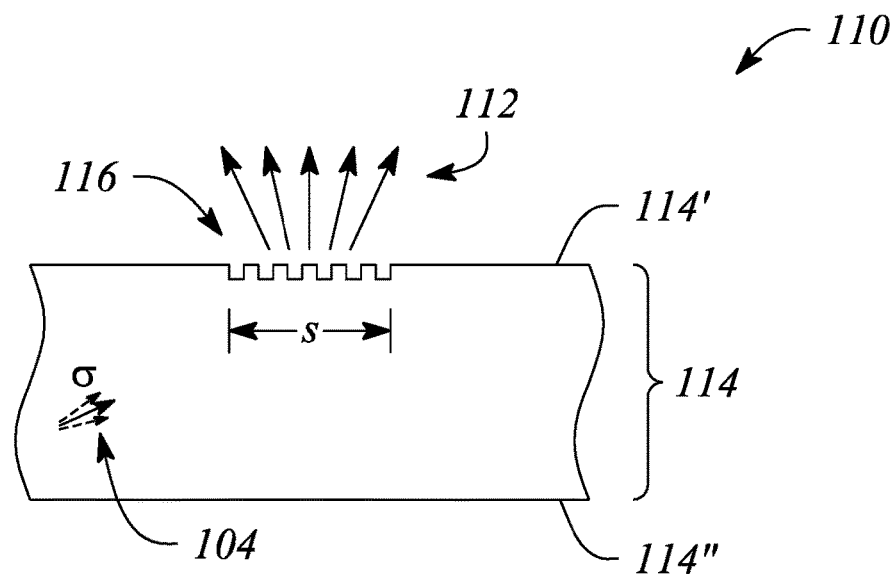
FIG. 6A illustrates a cross-sectional view of a portion of a multibeam backlight including a multibeam element in an example, according to an embodiment consistent with the principles described herein.
Figure 6B:
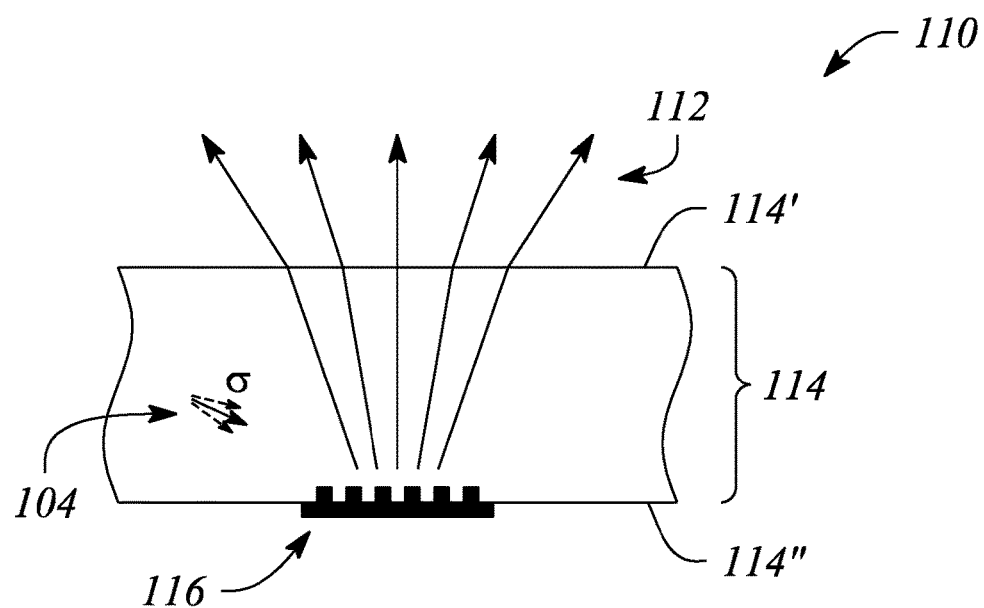
FIG. 6B illustrates a cross-sectional view of a portion of a multibeam backlight including a multibeam element in an example, according to another embodiment consistent with the principles described herein.

FIG. 6A illustrates a cross-sectional view of a portion of a multibeam backlight 110 including a multibeam element 116 in an example, according to an embodiment consistent with the principles described herein. FIG. 6B illustrates a cross-sectional view of a portion of a multibeam backlight 110 including a multibeam element 116 in an example, according to another embodiment consistent with the principles described herein. In particular, FIGS. 6A-6B illustrate the multibeam element 116 of the multibeam backlight 110 comprising a diffraction grating within the light guide 114. The diffraction grating is configured to diffractively scatter out of the light guide 114 a portion of the guided light 104 as the directional light beams 112. The diffraction grating comprises a plurality of diffractive features spaced apart from one another by a diffractive feature spacing or a diffractive feature or grating pitch (i.e., the pitch or spacing of the diffractive features in the diffractive grating). The spacing or pitch is configured to provide the diffractive coupling out of the guided light portion. According to various embodiments, the spacing or grating pitch of the diffractive features in the diffraction grating may be sub-wavelength (i.e., less than a wavelength of the guided light 104).

In some embodiments, the diffraction grating of the multibeam element 116 may be located at or adjacent to a surface of the light guide 114. For example, the diffraction grating may be at or adjacent to the first surface 114' of the light guide 114, as illustrated in FIG. 6A. The diffraction grating located at light guide first surface 114' may be a transmission mode diffraction grating configured to diffractively scatter out the guided light portion as the directional light beams 112 through the first surface 114'. In another example, as illustrated in FIG. 6B, the diffraction grating may be located at or adjacent to the second surface 114" of the light guide 114. When located at the second surface 114", the diffraction grating may be a reflection mode diffraction grating. As a reflection mode diffraction grating, the diffraction grating is configured to both diffract the guided light portion and reflect the diffracted guided light portion toward the first surface 114' to exit through the first surface 114' as the diffractively scattered-out, directional light beams 112. In other embodiments (not illustrated), the diffraction grating may be located between the surfaces of the light guide 114, e.g., as one or both of a transmission mode diffraction grating and a reflection mode diffraction grating. Note that, in some embodiments described herein, the principal angular directions of the directional light beams 112 may include an effect of refraction due to the directional light beams 112 exiting the light guide 114 at a light guide surface. For example, FIG. 6B illustrates refraction (i.e., bending) of the directional light beams 112 due to a change in refractive index as the directional light beams 112 exit through the first surface 114', by way of example and not limitation. Also see FIGS. 7A and 7B, described below.

According to some embodiments, the diffractive features of the diffraction grating may comprise one or both of grooves and ridges that are spaced apart from one another. The grooves or the ridges may comprise a material of the light guide 114, e.g., may be formed in a surface of the light guide 114. In another example, the grooves or the ridges may be formed from a material other than the light guide material, e.g., a film or a layer of another material on a surface of the light guide 114.

In some embodiments, the diffraction grating of the multibeam element 116 is a uniform diffraction grating in which the diffractive feature spacing is substantially constant or unvarying throughout the diffraction grating. In other embodiments, the diffraction grating is a chirped diffraction grating. By definition, the 'chirped' diffraction grating is a diffraction grating exhibiting or having a diffraction spacing of the diffractive features (i.e., the grating pitch) that varies across an extent or length of the chirped diffraction grating. In some embodiments, the chirped diffraction grating may have or exhibit a chirp of the diffractive feature spacing that varies linearly with distance. As such, the chirped diffraction grating is a 'linearly chirped' diffraction grating, by definition. In other embodiments, the chirped diffraction grating of the multibeam element 116 may exhibit a non-linear chirp of the diffractive feature spacing. Various non-linear chirps may be used including, but not limited to, an exponential chirp, a logarithmic chirp or a chirp that varies in another, substantially non-uniform or random but still monotonic manner. Non-monotonic chirps such as, but not limited to, a sinusoidal chirp or a triangle or sawtooth chirp, may also be employed. Combinations of any of these types of chirps may also be employed.

Figure 7A:
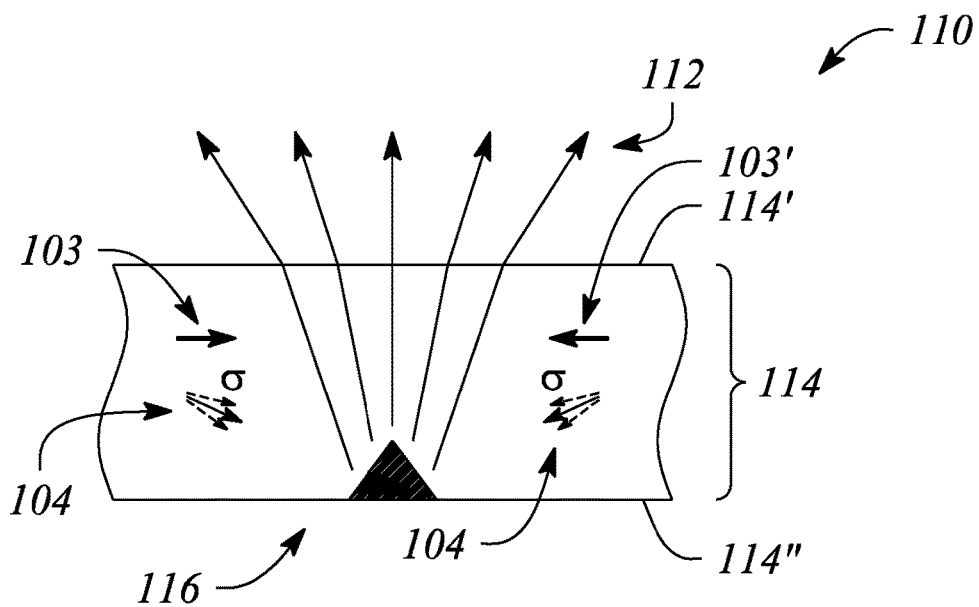
FIG. 7A illustrates a cross-sectional view of a portion of a multibeam backlight including a multibeam element in an example, according to another embodiment consistent with the principles described herein.
Figure 7B:
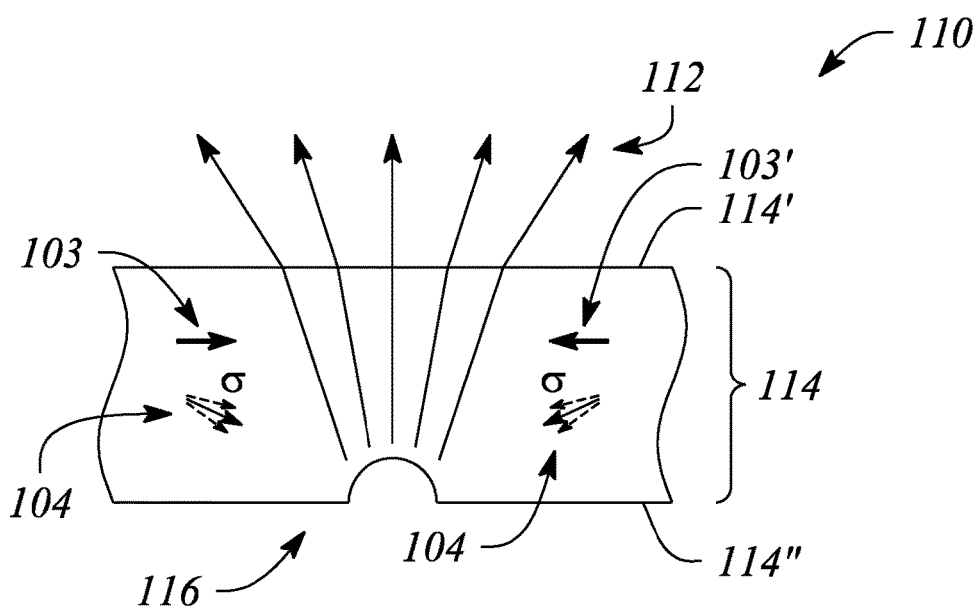
FIG. 7B illustrates a cross-sectional view of a portion of a multibeam backlight including a multibeam element in an example, according to another embodiment consistent with the principles described herein.

FIG. 7A illustrates a cross-sectional view of a portion of a multibeam backlight 110 including a multibeam element 116 in an example, according to another embodiment consistent with the principles described herein. FIG. 7B illustrates a cross-sectional view of a portion of a multibeam backlight 110 including a multibeam element 116 in an example, according to another embodiment consistent with the principles described herein. In particular, FIGS. 7A and 7B illustrate various embodiments of the multibeam element 116 comprising a micro-reflective element. Micro-reflective elements used as or in the multibeam element 116 may include, but are not limited to, a reflector that employs a reflective material or layer thereof (e.g., a reflective metal) or a reflector based on total internal reflection (TIR). According to some embodiments (e.g., as illustrated in FIGS. 7A-7B by way of example), the multibeam element 116 comprising the micro-reflective element may be located at or adjacent to a surface (e.g., the second surface 114") of the light guide 114. In other embodiments (not illustrated), the micro-reflective element may be located within the light guide 114 between the first and second surfaces 114', 114".

For example, FIG. 7A illustrates the multibeam element 116 comprising a micro-reflective element having reflective facets, for example, that may be similar to facets of a prism, (e.g., a 'prismatic' micro-reflective element) located adjacent to the second surface 114" of the light guide 114. The facets of the illustrated prismatic micro-reflective element are configured to reflect (i.e., reflectively scatter) the portion of the guided light 104 out of the light guide 114. The facets may be slanted or tilted (i.e., have a tilt angle) relative to a propagation direction of the guided light 104 to reflect the guided light portion out of light guide 114, for example. The facets may be formed using a reflective material within the light guide 114 (e.g., as illustrated in FIG. 7A) or may be surfaces of a prismatic cavity in the second surface 114", according to various embodiments. When a prismatic cavity is employed, either a refractive index change at the cavity surfaces may provide reflection (e.g., TIR reflection) or the cavity surfaces that form the facets may be coated with a reflective material to provide reflection, in some embodiments.

In another example, FIG. 7B illustrates the multibeam element 116 comprising a micro-reflective element having a curved surface such as, but not limited to, a semi-spherical micro-reflective element. In some examples, the curved surface of the micro-reflective element may be substantially smooth. A specific surface curve of the micro-reflective element may be configured to reflect the guided light portion in different directions depending on a point of incidence on the curved surface with which the guided light 104 makes contact, for example. As illustrated in FIGS. 7A and 7B, the guided light portion that is reflectively scattered out of the light guide 114 exits or is emitted from the first surface 114'. As with the prismatic micro-reflective element in FIG. 7A, the micro-reflective element in FIG. 7B may be either a reflective material within the light guide 114 or a cavity (e.g., a semi-circular cavity) formed in the second surface 114", as illustrated in FIG. 7B by way of example and not limitation. FIGS. 7A and 7B also illustrate the guided light 104 having two propagation directions indicated by bold arrows 103, 103', by way of example and not limitation. Using two propagation directions of the guided light 104 may facilitate providing the directional light beams 112 with substantially symmetrical distribution of principal angular directions, for example.

Figure 8:
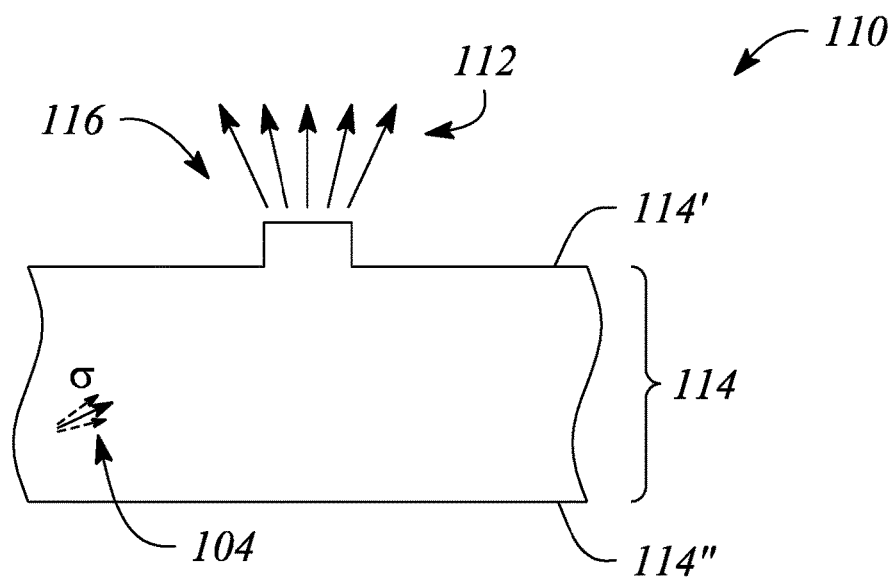
FIG. 8 illustrates a cross-sectional view of a portion of a multibeam backlight including a multibeam element in an example, according to another embodiment consistent with the principles described herein.

FIG. 8 illustrates a cross-sectional view of a portion of a multibeam backlight 110 including a multibeam element 116 in an example, according to another embodiment consistent with the principles described herein. In particular, FIG. 8 illustrates a multibeam element 116 comprising a micro-refractive element. According to various embodiments, the micro-refractive element is configured to refractively scatter out a portion of the guided light 104 from the light guide 114. That is, the micro-refractive element is configured to employ refraction (e.g., as opposed to diffraction or reflection) to scatter out the guided light portion from the light guide 114 as the directional light beams 112, as illustrated in FIG. 8. The micro-refractive element may have various shapes including, but not limited to, a semi-spherical shape, a rectangular shape or a prismatic shape (i.e., a shape having sloped facets). According to various embodiments, the micro-refractive element may extend or protrude out of a surface (e.g., the first surface 114') of the light guide 114, for example as illustrated, or may be a cavity in the surface (not illustrated). Further, the micro-refractive element may comprise a material of the light guide 114, in some embodiments. In other embodiments, the micro-refractive element may comprise another material adjacent to, and in some examples, in contact with the light guide surface.

Referring again to FIGS. 5A and 5C, the multibeam backlight 110 may further comprise a light source 118, in some embodiments. The light source 118 is configured to provide the light to be guided within light guide 114 at a non-zero propagation angle. In particular, the light source 118 may be located adjacent to an entrance surface or end (input end) of the light guide 114. In various embodiments, the light source 118 may comprise substantially any source of light (e.g., optical emitter), e.g., as provided above, including, but not limited to, one or more light emitting diodes (LEDs) or a laser (e.g., laser diode). In some embodiments, the light source 118 may comprise an optical emitter configured produce a substantially monochromatic light having a narrowband spectrum denoted by a particular color. In particular, the color of the monochromatic light may be a primary color of a particular color space or color model (e.g., a red-green-blue (RGB) color model). In other examples, the light source 118 may be a substantially broadband light source configured to provide substantially broadband or polychromatic light. For example, the light source 118 may provide white light. In some embodiments, the light source 118 may comprise a plurality of different optical emitters configured to provide different colors of light. The different optical emitters may be configured to provide light having different, color-specific, non-zero propagation angles of the guided light 104 corresponding to each of the different colors of light.

In some embodiments, the light source 118 may further comprise a collimator. The collimator may be configured to receive substantially uncollimated light from one or more of the optical emitters of the light source 118. The collimator is further configured to convert the substantially uncollimated light into collimated light. In particular, the collimator may provide collimated light having the non-zero propagation angle and being collimated according to a predetermined collimation factor σ, according to some embodiments. Moreover, when optical emitters of different colors are employed, the collimator may be configured to provide the collimated light having one or both of different, color-specific, non-zero propagation angles and having different color-specific collimation factors. The collimator is further configured to communicate the collimated light beam to the light guide 114 to propagate as the guided light 104, described above.

In some embodiments, one or both of the non-zero propagation angle and the collimation factor of the guided light may be configured to adjust an emission pattern of the directional light beams 112 in the user-tracking multiview display 100. In particular, the non-zero propagation angle may be configured to tilt (or selectively direct) the emission pattern toward the user. For example, a first non-zero propagation angle may be configured to provide an emission pattern of the directional light beams 112 that is substantially directed toward the user in the first position A and a second non-zero propagation angle may be configured to direct the emission pattern toward the user in the second position B, as described above with respect to FIGS. 4A-4B, for example.

In some embodiments, the multibeam backlight 110 is configured to be substantially transparent to light in a direction through the light guide 114 orthogonal to the propagation direction (i.e., bold arrows 103, 103') of the guided light 104. In particular, the light guide 114 and the spaced apart plurality of multibeam elements 116 allow light to pass through the light guide 114 and specifically through both the first surface 114' and the second surface 114", in some embodiments. Transparency may be facilitated, at least in part, due to both the relatively small size of the multibeam elements 116 and the relative large inter-element spacing (e.g., a one-to-one correspondence with multiview pixels) of the multibeam element 116.

In accordance with some embodiments of the principles described herein, a user-tracking multiview display system is provided. The user-tracking multiview display system is configured to provide or to 'display' a multiview image representing a scene or an object, for example. In particular, the multiview image is provided as a plurality of different 'views' associated with the multiview image. The different views may provide a 'glasses free' (e.g., autostereoscopic) representation of information in the multiview image being displayed, for example. Moreover, different sets of views may be provided for different locations or positions (e.g., head locations) of a user of the user-tracking multiview display system, according to various embodiments.

Figure 9:
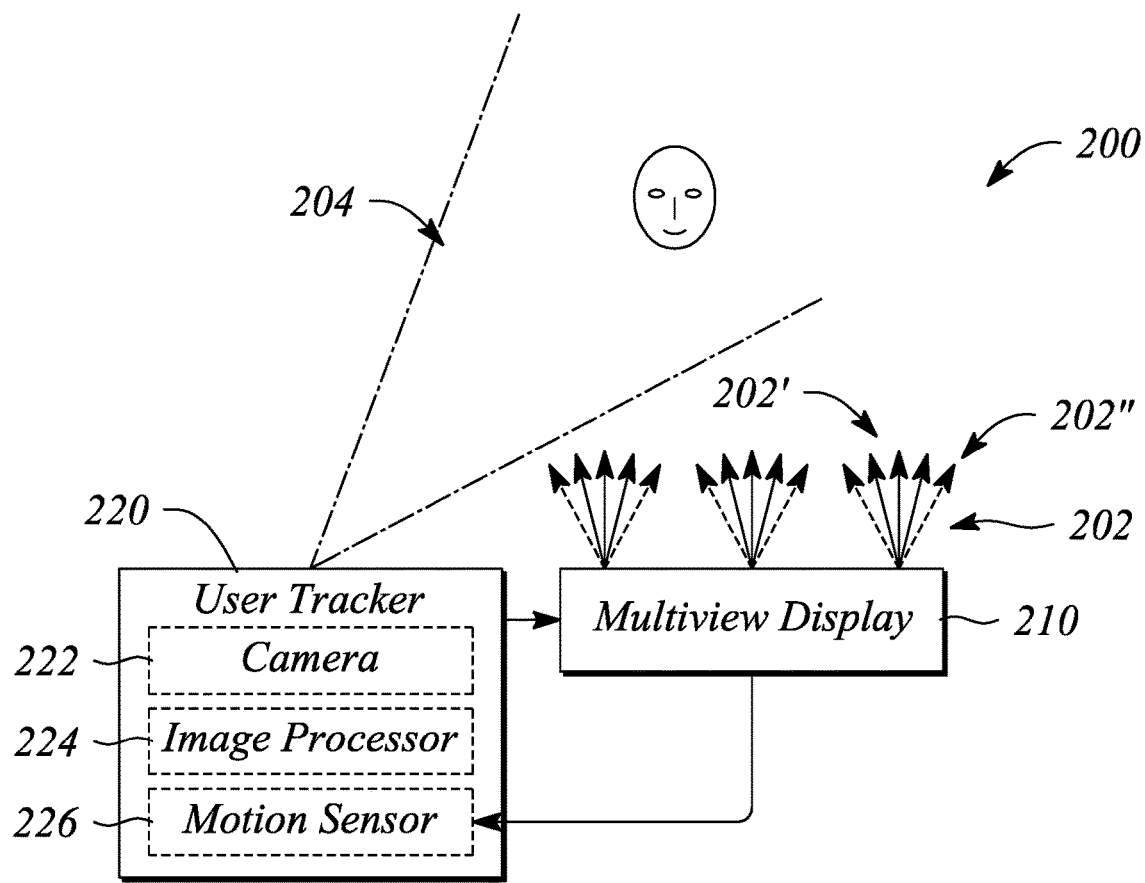
FIG. 9 illustrates a block diagram of a user-tracking multiview display system in an example, according to an embodiment consistent with the principles described herein.

FIG. 9 illustrates a block diagram of a user-tracking multiview display system 200 in an example, according to an embodiment consistent with the principles described herein. The user-tracking multiview display system 200 is configured to display a multiview image according to different views in different view directions. In particular, light beams emitted by the user-tracking multiview display system 200 are used to display a multiview image and may correspond to pixels of the different views (i.e., view pixels). The different views or equivalently different view directions are illustrated as arrows 202 emanating from the user-tracking multiview display system 200 in FIG. 9. As provided below, the arrows 202 may also represent the light beams emitted by the user-tracking multiview display system 200.

The user-tracking multiview display system 200 illustrated in FIG. 9 comprises a multiview display 210. The multiview display 210 is configured to provide a multiview image comprising a plurality of views (e.g., arrows 202). According to various embodiments, the plurality of views of the multiview image comprises a set of primary views and a secondary view located angularly adjacent to a terminal view of the primary view set. The secondary view (or a plurality of secondary views, in some embodiments) may be combined with a subset of the views of the primary view set to provide an augmented set of views, as described herein. In addition, the primary view set, the secondary view and the augmented view set of the user-tracking multiview display system 200 may be substantially similar to the corresponding view sets and views described above with respect to the above-described user-tracking multiview display 100, according to some embodiments. In FIG. 9, the primary views are represented by solid-line arrows 202' and the secondary view is represented by a dashed-line arrows 202".

The multiview display 210 of the user-tracking multiview display system 200 may comprise substantially any of a variety of different multiview displays that may be configured to provide both the primary set of views and one or more of the secondary views. For example, the multiview display 210 may be a multiview display such as, but is not limited to, a multibeam diffraction grating-based multiview display or a lenticular or lens array-based multiview display. Herein, by definition, a 'multibeam diffraction grating-based multiview display' is a multiview display that comprises a multibeam diffraction grating based backlight that employs an array of multibeam diffraction gratings. Also by definition herein, a lenticular or lens array-based multiview display is a multiview display that includes a lens array to provide views in different view directions.

In other embodiments, the multiview display 210 may be a multibeam element-based multiview display. In particular, multiview display 210 of the user-tracking multiview display system 200 may be substantially similar to the above-described user-tracking multiview display 100, according to some embodiments. For example, the multiview display 210 may comprise a multibeam backlight configured to provide a plurality of emitted or scattered-out light beams having different principal angular directions corresponding to the different view directions of the plurality of views. The multiview display 210 may further comprise a light valve array configured to modulate the plurality of scattered-out light beams to provide the plurality of views, for example. Moreover, the multiview display 210 may further comprise a light source, such as the light source 118 described above with respect to the user-tracking multiview display 100.

According to some of these embodiments, the multibeam backlight of the user-tracking multiview display system 200 may be substantially similar to the multibeam backlight 110, described above. For example, the multibeam backlight may comprise a light guide configured to guide light in a propagation direction along a length of the light guide and further comprise an array of multibeam elements spaced apart from one another along the light guide length. A multibeam element of the multibeam element array may be configured to couple or scatter out from the light guide a portion of the guided light as directional light beams having the different principal angular directions. The multibeam elements of the multibeam element array may be substantially similar to the multibeam elements 116 and the light guide may be substantially similar to the light guide 114, for example.

In some embodiments, a size of the multibeam element may be comparable to a size of a light valve of the light valve array. Moreover, a light valve may be substantially comparable in size to a sub-pixel in a multiview pixel of the display. Further, the multibeam element may comprise one or more of a diffraction grating, a micro-reflective element and a micro-refractive element optically connected to the light guide to couple out the portion of the guided light. In some embodiments, an inter-element distance between adjacent multibeam elements of the multibeam element array corresponds to an inter-pixel distance between adjacent multiview pixels. Moreover, a multiview pixel represents a set light valves within the light valve array corresponding to an individual multibeam element.

Referring again to FIG. 9, the user-tracking multiview display system 200 further comprises a user tracker 220. The user tracker 220 is configured to track a position a user relative to the multiview display 210. In particular, the user tracker 220 employs a combination of periodically measuring a user location and monitoring a relative motion of the multiview display between periodic user location measurements to track the user position, according to various embodiments. In some embodiments, the relative motion of the multiview display 210 provides an estimate of a user location during time intervals between periodic user location measurements.

At a first user position, the multiview display 210 is configured to provide the set of primary views. Further, at a second user position, the multiview display 210 is configured to provide an augmented set of views comprising the secondary view and a subset of the views of the primary view set. As illustrated in FIG. 9, the user tracker 220 may be configured to track a location of the user (e.g., of a user's head) in a region 204 in front of the multiview display 210 delineated by dash-dot lines. By 'in front of' is meant adjacent to a light emitting surface or an image view screen of the multiview display 210.

According to various embodiments, any of a variety of devices, systems and circuits that provide user tracking by measuring a location of the user (or equivalently determining of a user's position) may be employed to provide periodic measurement of the user location to the user tracker 220 of the user-tracking multiview display system 200. For example, in some embodiments (e.g., as illustrated in FIG. 9), the user tracker 220 may comprise a camera 222 configured to periodically capture an image of the user relative to the view screen of the multiview display 210. Further, the user tracker 220 may comprise an image processor 224 (or general purpose computer programmed as an image processor) configured to measure a position of the user within the captured image relative to the view screen of the multiview display 210 and provide the periodic user location measurement. The user's position relative to the multiview display 210 may be determined from the captured image by the image processor 224 using various techniques including, but not limited to, image recognition or pattern matching, for example. Other examples of the user tracker 220 may include any of a variety of two-dimensional (2D) and three-dimension (3D) object tracking systems such as, but are not limited to, Kinect® object tracking system to provide periodic user location measurements. Kinect® is a registered trademark of Microsoft Corporation, Redmond, WA.

According to various embodiments, the periodic user location measurements may be performed at any of various periodic intervals. For example, the periodic user location measurement may be performed once every tenth of a second, or once every second, or once every ten seconds, or once every minute, and so on. Periodic measurement of the user location may be employed to reduce power consumption, for example.

As mentioned above, the user tracker 220 also employs relative motion of the multiview display 210 in combination with the periodic user location measurement to determine the location of the user. According to various embodiments, the user tracker 220 may further comprises a motion sensor 226 to provide the determined location of the user. The motion sensor 226 is configured to track a relative motion of the multiview display during the time intervals between the periodic user location measurements to determine the relative motion of the multiview display. The motion sensor 226 may comprise any of a variety of motion sensors including, but not limited to, one or both of a gyroscope and an accelerometer to monitor the relative motion of the multiview display 210.

During operation, the determined position provided by the combination of the periodic user location measurement and the relative motion of the multiview display may correspond to one of the first user position A and the second user position B, described above, for example. An output of the user tracker 220 may be used to modify an operation (e.g., modulation of light beams by the light valve array) of the multiview display 210. For example, the determined position of the user may be provided to one or both of a processor and a light valve driver (e.g., driver circuit) of the multiview display 210 to adjust the emission pattern from the multiview display 210 to correspond to the user's position.

In some embodiments (not illustrated), the multiview display 210 of the user-tracking multiview display system 200 may further comprise a light source. The light source is configured to act as a source of light for the multiview display 210. In particular, in some of these embodiments, the light source may be configured to provide the light to the light guide with a non-zero propagation angle and, in some embodiments, is collimated according to a collimation factor to provide a predetermined angular spread of the guided light within the light guide, for example.

Figure 10:
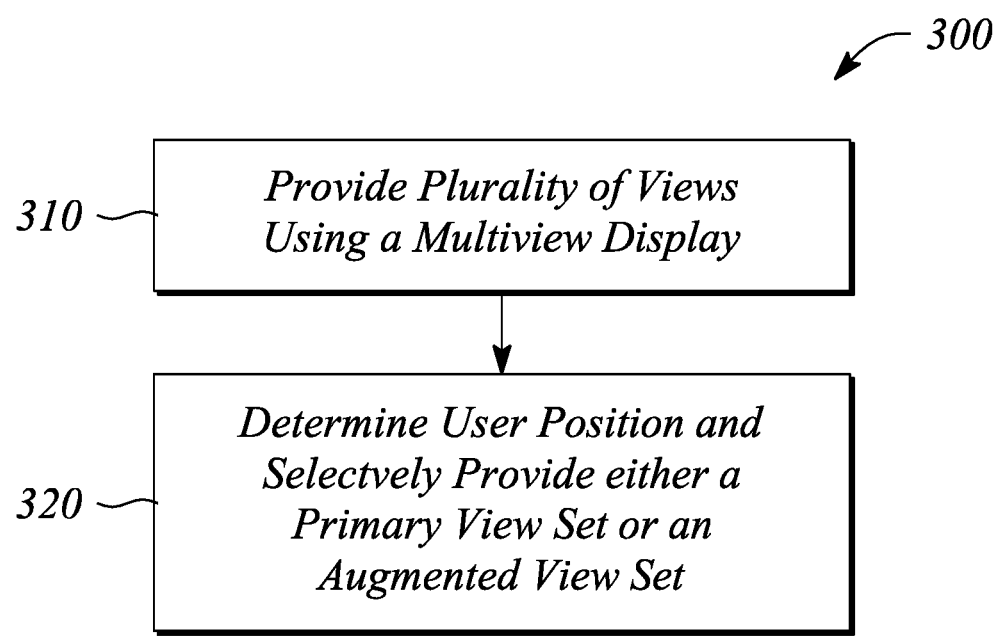
FIG. 10 illustrates a flow chart of a method of multiview display operation employing user tracking in an example, according to an embodiment consistent with the principles described herein.

In accordance with other embodiments of the principles described herein, a method of multiview display operation employing user tracking is provided. FIG. 10 illustrates a flow chart of a method 300 of multiview display operation employing user tracking in an example, according to an embodiment consistent with the principles described herein. As illustrated in FIG. 10, the method 300 of multiview display operation comprises providing 310 a plurality of views of a scene using a multiview display. According to various embodiments, the plurality of views comprises a set of primary views of the scene and a secondary view located angularly adjacent to a terminal view of the primary view set. In some embodiments, the secondary view may comprise the terminal view of the primary set. In other embodiments, the secondary view may comprise a perspective view that is angularly adjacent to the terminal view of the primary view set.

According to various embodiments, the multiview display that provides 310 a plurality of views may be substantially any multiview display or multiview display system that is able to provide both the set of primary views and the secondary view. For example, the multiview display may be a multiview display such as, but is not limited to, a multibeam element-based multiview display, a multibeam diffraction grating-based multiview display or a lenticular or lens array-based multiview display. In some embodiments, the multiview display may be substantially similar to the user-tracking multiview display 100, described above.

In particular, the multiview display may comprise a light guide, a multibeam element and a plurality of light valves, in some embodiments. In these embodiments, providing 310 a plurality of views may comprise guiding light in a propagation direction along a length of the light guide. The light guide may be a plate light guide, for example. Providing 310 a plurality of views may further comprise scattering a portion of the guided light out of the light guide using the multibeam element to provide a plurality of scattered-out directional light beams having different principal angular directions corresponding to respective different view directions of the multiview display. In some embodiments, the multibeam element may comprise one or more of a diffraction grating, a micro-reflective element and a micro-refractive element optically connected to the light guide to couple out the portion of the guided light. The multibeam element may be a member of an array of multibeam elements, for example. In these embodiments, providing 310 a plurality of views further comprise modulating the plurality of scattered-out directional light beams using the plurality of light valves to provide the plurality of views of the scene as a multiview image. The light valves may be arranged in an array adjacent to a surface of the light guide with the array of multibeam elements, for example. In some embodiments, a size of the multibeam element is comparable to a size of a light valve of the light valve array.

As illustrated in FIG. 10, the method 300 of multiview display operation employing user tracking further comprises determining 320 a position of a user relative to the multiview display and selecting a view set to display or provide to the user according to the determined user position. In particular, determining 320 a position of the user uses a combination of periodic user location measurement and relative motion of the multiview display. According to various embodiments, the multiview display selectively provides the primary view set when the user is determined to be in a first position and selectively provides an augmented set of views comprising the secondary view when the user is determined to be in a second position. By definition, the augmented set of views comprises the secondary view and a subset of the views of the primary view set.

In other words, the method 300 of multiview display operation determines 320 the user's position relative the multiview display (or relative to a screen of or views provided by the multiview display) using both the periodic user location measurement and the relative motion of the multiview display. The method 300 of multiview display operation selectively provides either the primary view set or the augmented set of views depending on whether the user is determined 320 to be in the first position or second position. In particular, when the user is determined to be in the first position (e.g., in front of the multiview display), the multiview display provides the set of primary views. Moreover, when the user is determined 320 to be in the second position (e.g., substantially off to a side of the multiview display), the multiview display provides the augmented view set that includes the secondary view. As such, the multiview display adapts or adjusts the provided 310 plurality of views to include either the primary view set or the augmented view set depending on the determined 320 position of the user.

In some embodiments, determining 320 a position of a user comprises using a user tracker. In some of these embodiments, the user tracker may be substantially similar to the user tracker 220 of the user-tracking multiview display system 200. For example, the user tracker may comprise a camera, an image processor, and a motion sensor. In this example, determining 320 a position of the user may comprise periodically capturing an image of the user using the camera; and establishing a location of the user within the captured image using the image processor to provide the periodic user location measurement. Further, determining 320 a position of the user comprises monitoring a relative motion of the multiview display to provide an estimate of the user location during time intervals between the periodic user location measurements. Relative motion may be provided by a motion sensor, for example. According to various embodiments, determined 320 position of the user may correspond to one of the determined first position and the determined second position.

Thus, there have been described examples and embodiments of a user-tracking multiview display, a user-tracking multiview display system, and a method of multiview display operation employing user tracking that employ both a set of primary views and an augmented set of views including a secondary view and a subset of the views of the primary view set. It should be understood that the above-described examples are merely illustrative of some of the many specific examples that represent the principles described herein. Clearly, those skilled in the art can readily devise numerous other arrangements without departing from the scope as defined by the following claims.

What is claimed is:

1. A user-tracking multiview display comprising:
a multiview display configured to provide a multiview image, the multiview image comprising a set of primary views and a secondary view located angularly adjacent to a terminal view of the primary view set,
wherein the user-tracking multiview display is configured to selectively provide either the primary view set or an augmented set of views comprising the secondary view and a subset of the views of the primary view set according to a location of a user determined by a both a relative motion of the user-tracking multiview display and a periodic user-location measurement, and wherein either the secondary view comprises the terminal view or the secondary view comprises a perspective view that is angularly adjacent to the terminal view of the primary view set.

2. A user-tracking multiview display system comprising the user-tracking multiview display of claim 1, the user-tracking multiview display system further comprising a user tracker configured to determine a position of a user relative to the multiview display using both the periodic user-location measurement and the relative motion of the user-tracking multiview display during time intervals between periodic user-location measurements, wherein at a determined first position the user-tracking multiview display is configured to selectively provide the set of primary views and at a determined second position the user-tracking multiview display is configured to provide the augmented set of views including the secondary view.

3. The user-tracking multiview display system of claim 2, wherein the user tracker comprises:

a user-location measurement system comprising a camera configured to periodically capture an image of the user and an image processor configured to determine a position of the user within the periodically captured image to provide the periodic user-location measurement; and a motion sensor configured to track a relative motion of the multiview display during the time intervals between the periodic user-location measurements to determine the relative motion of the user-tracking multiview display, wherein the relative motion is configured to provide an estimate of the user location during the time intervals between the periodic user-location measurements.

4. The user-tracking multiview display of claim 1, further comprising:

a multibeam backlight configured to provide directional light beams having directions corresponding to view directions of the multiview image; and a light valve array configured to modulate the directional light beams as the multiview image.

5. The user-tracking multiview display of claim 4, wherein the multibeam backlight comprises:

a light guide configured to guide light in a propagation direction along a length of the light guide; and a plurality of multibeam elements spaced apart from one another along the light guide length, a multibeam element of the plurality of multibeam elements being configured to scatter out from the light guide a portion of the guided light as the directional light beams, wherein a size of the multibeam element is comparable to a size of a light valve of the light valve array.

6. The user-tracking multiview display of claim 5, wherein the size of the multibeam element is between fifty percent and two hundred percent of the light valve size.

7. The user-tracking multiview display of claim 5, wherein the multibeam element comprises a diffraction grating configured to diffractively scatter out the portion of the guided light as the directional light beams.

8. The user-tracking multiview display of claim 5, wherein the multibeam element comprises one or both of a micro-reflective element and a micro-refractive element, the micro-reflective element being configured to reflectively scatter out a portion of the guided light, the micro-refractive element being configured to refractively scatter out a portion of the guided light.

9. The user-tracking multiview display of claim 5, further comprising a light source optically coupled to an input of the multibeam backlight, the light source being configured to provide light to be guided in the multibeam backlight as guided light one or both of having a non-zero propagation angle and being collimated according to a predetermined collimation factor.

10. A user-tracking multiview display system comprising:

a multiview display configured to provide a multiview image, a plurality of views of the multiview image comprising a set of primary views and a secondary view located angularly adjacent to a terminal view of the primary view set; and a user tracker configured to track a position of a user relative to the multiview display by a combination of periodically measuring a user location and monitoring a relative motion of the multiview display between periodic user-location measurements, wherein the multiview display is configured to provide the primary view set at a first user position and to provide an augmented set of views comprising the secondary view at a second user position relative to the multiview display, and wherein the user tracker comprises:

a camera configured to periodically capture an image of the user;

an image processor configured to measure a position of the user within the captured image to provide the periodic user location measurement; and a motion sensor comprising one or both of a gyroscope and an accelerometer to monitor the relative motion of the multiview display, the relative motion being configured to provide an estimate of the user location during time intervals between the periodic user location measurements.

11. The user-tracking multiview display system of claim 10, wherein the multiview display comprises:

a multibeam backlight configured to provide a plurality of directional light beams having different principal angular directions corresponding to different view directions of the plurality of views; and a light valve array configured to modulate the plurality of directional light beams to provide the plurality of views.

12. The user-tracking multiview display system of claim 11, wherein the multibeam backlight comprises:

a light guide configured to guide light in a propagation direction along a length of the light guide; and an array of multibeam elements spaced apart from one another along the light guide length, a multibeam element of the multibeam element array being configured to scatter out from the light guide a portion of the guided light as the plurality of directional light beams having the different principal angular directions, wherein a size of the multibeam element is comparable to a size of a light valve of the light valve array.

13. The user-tracking multiview display system of claim 12, wherein the multibeam element comprises one or more of a diffraction grating, a micro-reflective element and a micro-refractive element optically connected to the light guide to scatter out the portion of the guided light.

14. The user-tracking multiview display system of claim 10, wherein the secondary view comprises one of the terminal view and a perspective view that is angularly adjacent to the terminal view of the primary view set.

15. A method of multiview display operation employing user tracking, the method comprising:

providing a plurality of views of a scene using a multiview display, the plurality of views comprising a set of primary views and a secondary view located angularly adjacent to a terminal view of the primary view set; and determining a position of a user relative to the multiview display using a combination of periodic user-location measurement and relative motion of the of the multiview display, the multiview display selectively providing the primary view set when the user is determined to be in a first position and selectively providing an augmented set of views comprising the secondary view when the user is determined to be in a second position, wherein determining a position of the user comprises:

periodically capturing an image of the user using a camera;

establishing a location of the user within the captured image using an image processor, the established location corresponding to the periodic user location measurement; and monitoring a relative motion of the multiview display to provide an estimate of the user location during time intervals between the periodic user location measurements.

16. The method of multiview display operation of claim 15, wherein providing a plurality of views comprises:

guiding light in a propagation direction along a length of a light guide; and scattering a portion of the guided light out of the light guide using a multibeam element to provide a plurality of scattered-out directional light beams having different principal angular directions corresponding to respective different view directions of the multiview display; and modulating the plurality of scattered-out directional light beams using a plurality of light valves to provide the plurality of views of the scene as a multiview image, wherein a size of the multibeam element is comparable to a size of a light valve of the light valve plurality.

17. The method of multiview display operation of claim 15, wherein the secondary view comprises one of the terminal view and a perspective view that is angularly adjacent to the terminal view of the primary view set.

* * * * *

UNITED STATES PATENT AND TRADEMARK OFFICE
CERTIFICATE OF CORRECTION

PATENT NO. : 12,177,414 B2
APPLICATION NO. : 17/182054
DATED : December 24, 2024
INVENTOR(S) : David A. Fattal Page 1 of 1

It is certified that error appears in the above-identified patent and that said Letters Patent is hereby corrected as shown below:

In the Claims

In Column 29, Line 7, in Claim 15, delete "of the of the" and insert --of the-- therefor Signed and Sealed this
Twenty-second Day of July, 2025

Coke Morgan Stewart
*Acting Director of the United States Patent and Trademark Office*